(12) United States Patent
Takeda et al.

(10) Patent No.: US 11,070,334 B2
(45) Date of Patent: Jul. 20, 2021

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Qin Mu, Beijing (CN); Liu Liu, Beijing (CN); Xu Zhang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 49 days.

(21) Appl. No.: 16/606,178

(22) PCT Filed: Apr. 20, 2017

(86) PCT No.: PCT/JP2017/015939
§ 371 (c)(1),
(2) Date: Oct. 17, 2019

(87) PCT Pub. No.: WO2018/193594
PCT Pub. Date: Oct. 25, 2018

(65) Prior Publication Data
US 2020/0052846 A1  Feb. 13, 2020

(51) Int. Cl.
*H04L 5/00* (2006.01)

(52) U.S. Cl.
CPC .......... *H04L 5/0048* (2013.01); *H04L 5/0007* (2013.01)

(58) Field of Classification Search
CPC .............................. H04L 5/0048; H04L 5/0007
See application file for complete search history.

(56) References Cited

PUBLICATIONS

International Search Report issued in PCT/JP2017/015939 dated May 23, 2017 (2 Pages).
Written Opinion of the International Searching Authority issued in PCT/JP2017/015939 dated May 23, 2017 (5 Pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 Pages).
NTT Docomo, Inc.; "Monitoring of DL control channel for NR"; 3GPP TSG RAN WG1 AH_NR Meeting, R1-1700620; Spokane, USA, Jan. 16-20, 2017 (7 Pages).
Intel Corporation; "DSMR design for NR PDCCH"; 3GPP TSG RAN WG1 #88, R1-1702221; Athens, Greece, Feb. 13-17, 2017 (4 Pages).
Samsung; "DMRS structure for NR-PDCCH"; 3GPP TSG RAN WG1 Meeting #88bis, R1-1705375; Spokane, USA, Apr. 3-7, 2017 (5 Pages).

*Primary Examiner* — Ronald B Abelson
(74) *Attorney, Agent, or Firm* — Osha Bergman Watanabe & Burton LLP

(57) ABSTRACT

For the purpose of reducing the deterioration of the quality of communication and/or the drop in the efficiency of the use of resources even when communication is carried out based on different configurations from those of existing LTE systems, according to one aspect of the present invention, a user terminal has a receiving section that receives a downlink control channel, which is transmitted by using a downlink control channel element comprised of a plurality of resource element groups (REGs) and/or one or more REG groups, and a reference signal, which is used to demodulate the downlink control channel, and a control section that controls receipt of the downlink control channel in a certain field, and an allocation pattern of the reference signal is configured in association with at least one of the REG group, the downlink control channel element and the certain field.

8 Claims, 17 Drawing Sheets

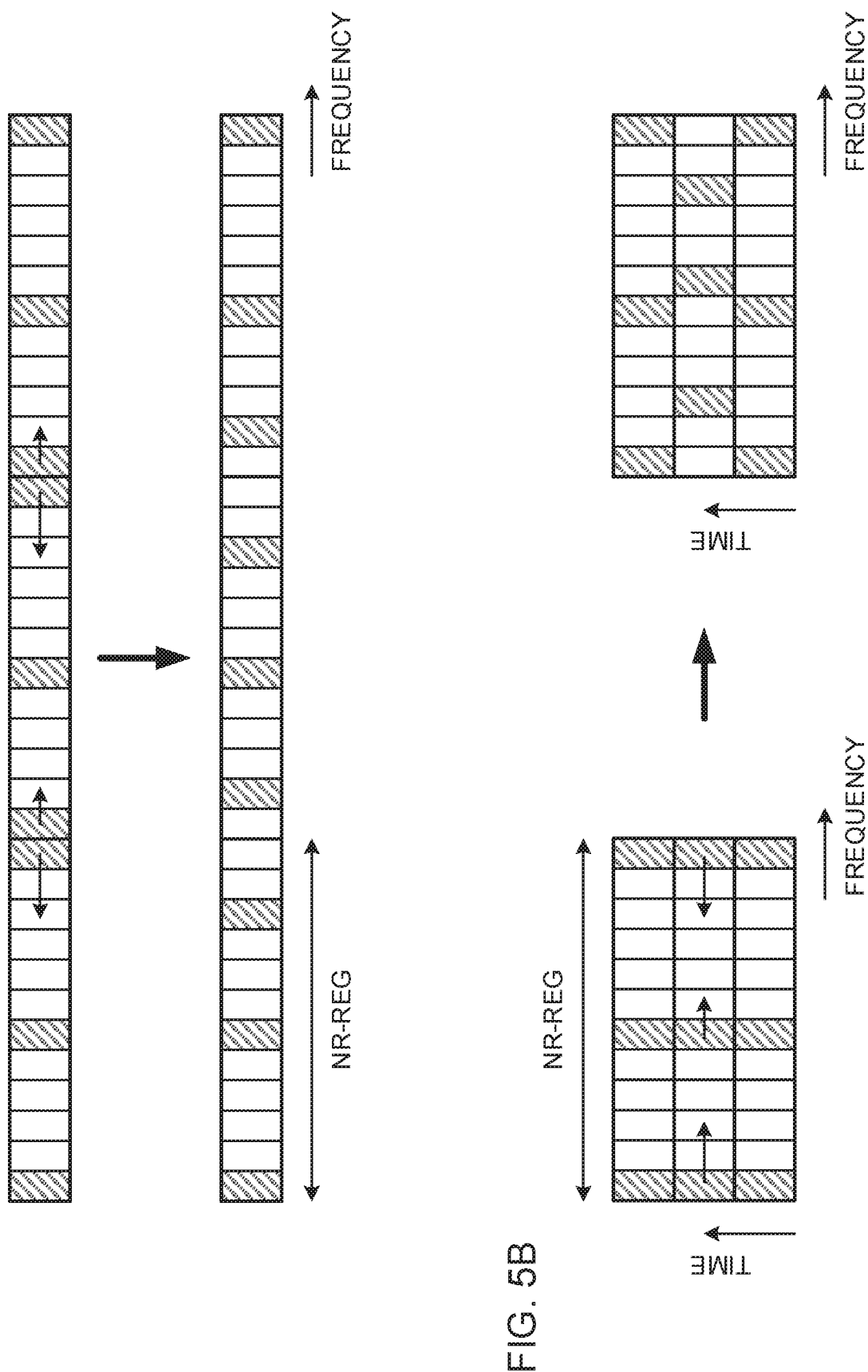

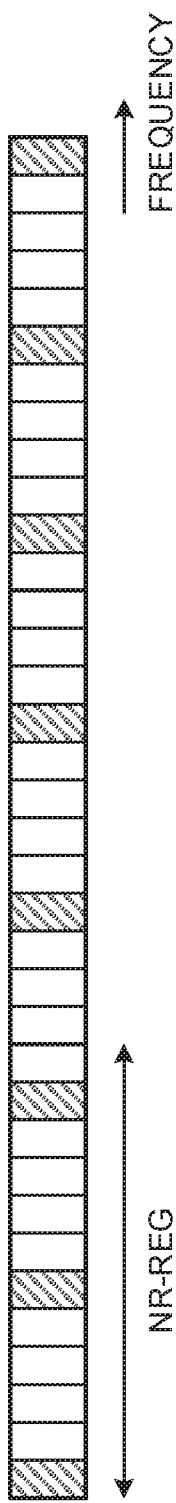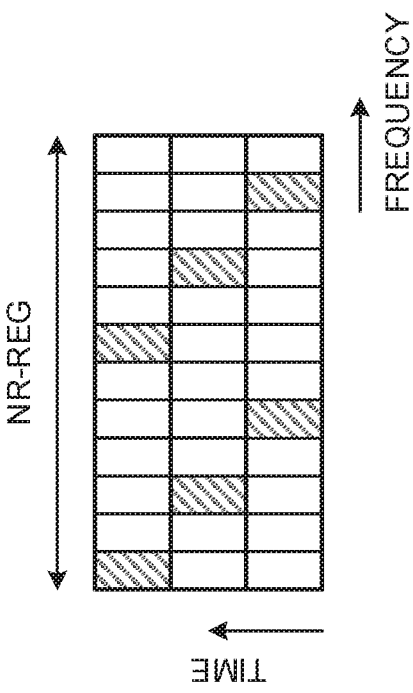
FIG. 6A
FIG. 6B

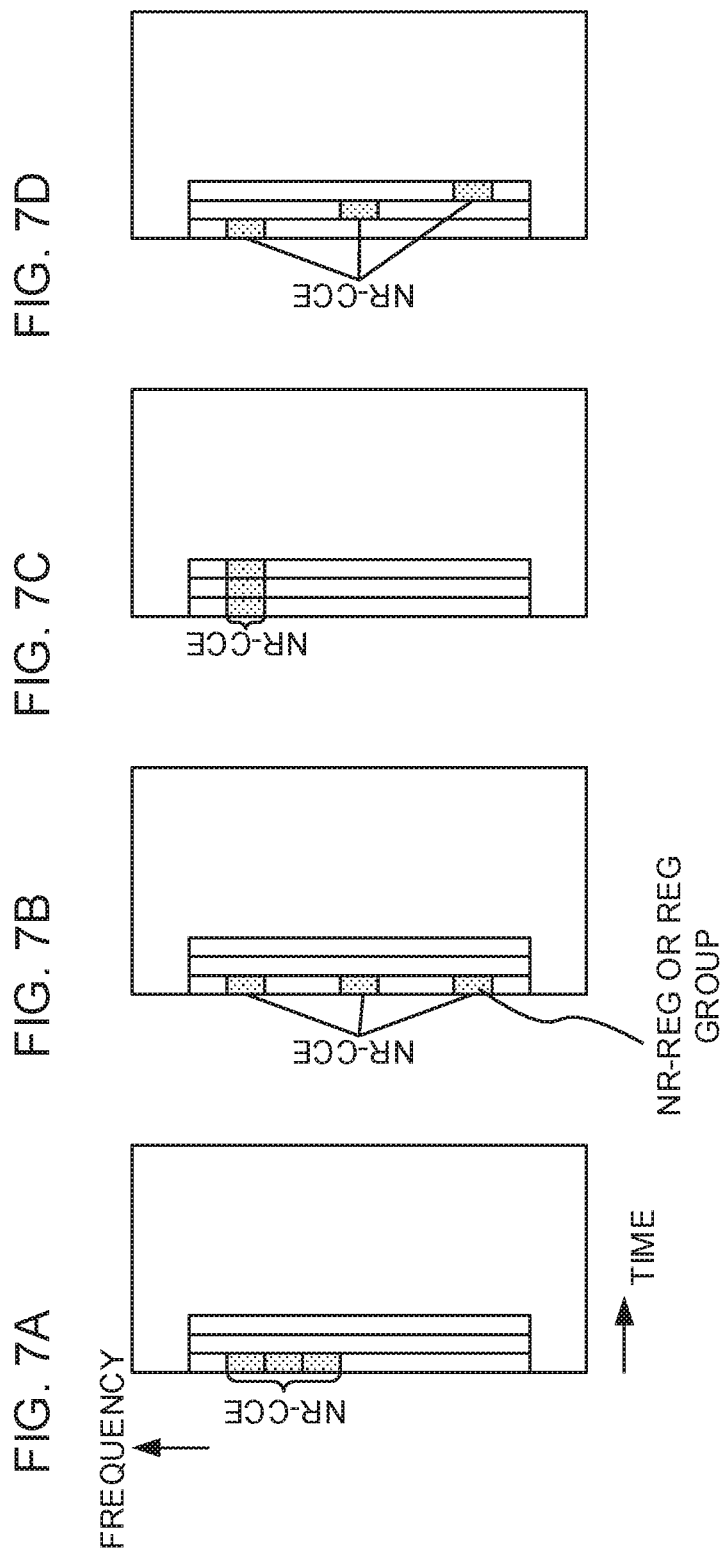

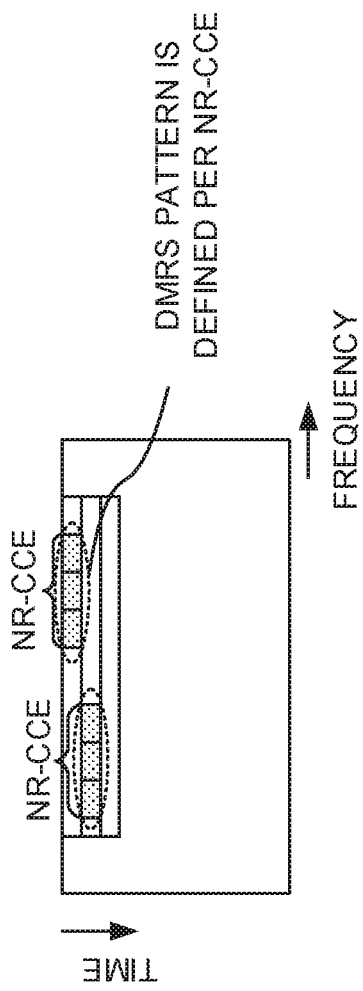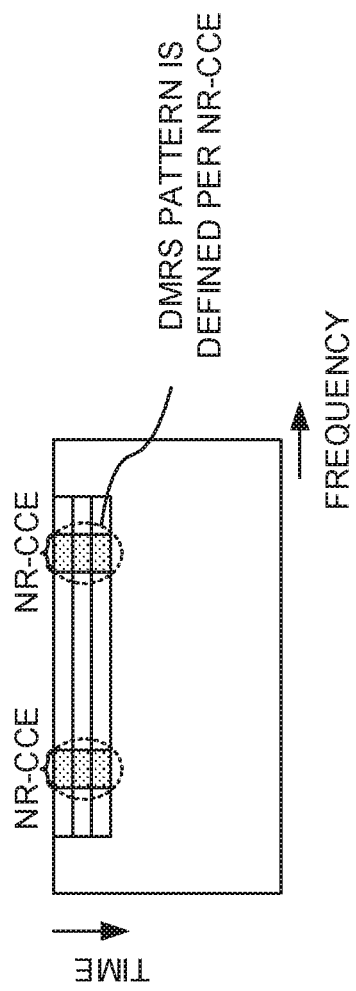

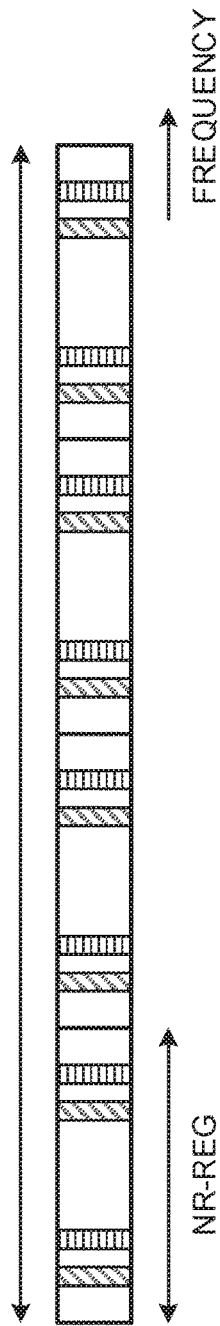
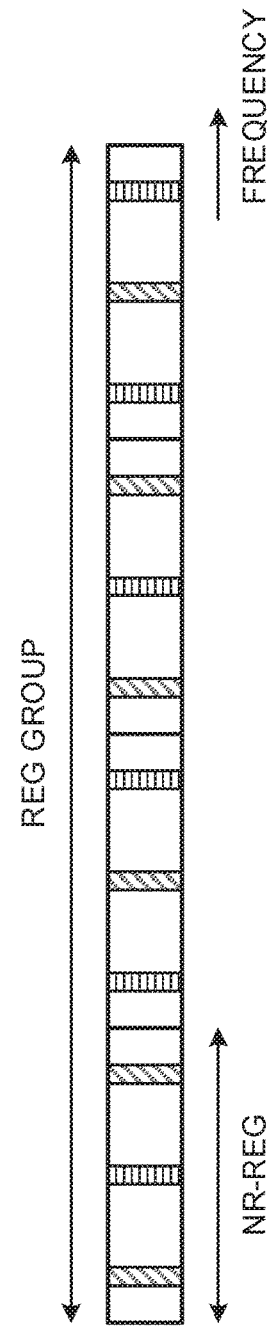
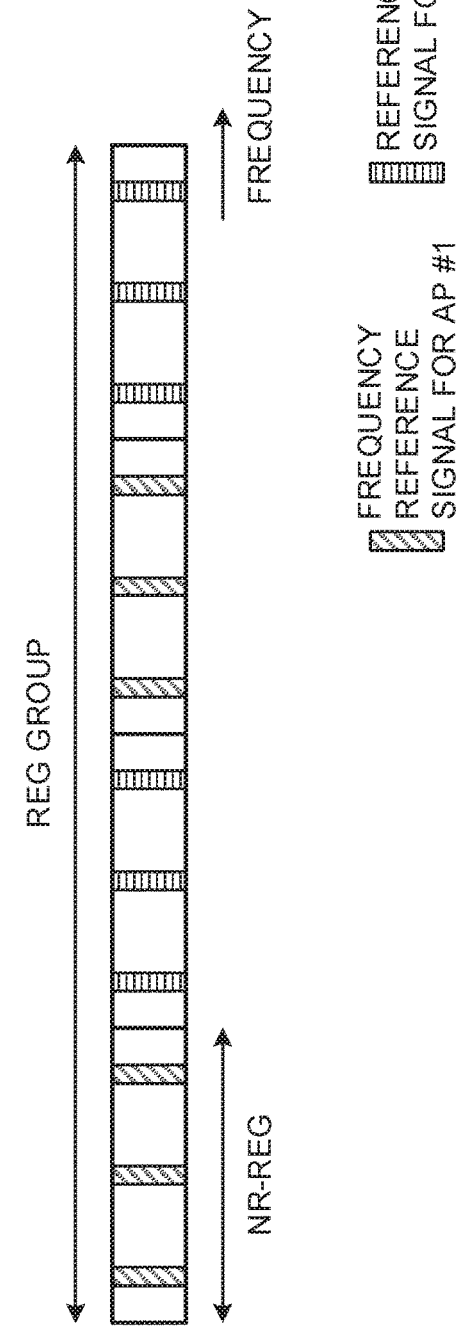
FIG. 11A
FIG. 11B
FIG. 11C

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). Also, the specifications of LTE-A (also referred to as "LTE-advanced," "LTE Rel. 10," "LTE Rel. 11," or "LTE Rel. 12") have been drafted for further broadbandization and increased speed beyond LTE (al so referred to as "LTE Rel. 8" or "LTE Rel. 9"), and successor systems of LTE (also referred to as, for example, "FRA (Future Radio Access)," "5G (5th generation mobile communication system)," "5G+ (plus)," "NR (New Radio)," "NX (New radio access)," "FX (Future generation radio access)," "LTE Rel. 13," "LTE Rel. 14," "LTE Rel. 15" or later versions) are under study.

In existing LTE systems (for example, LTE Rel. 8 to 13), downlink (DL) and/or uplink (UL) communication are performed using 1-ms subframes (also referred to as "transmission time intervals (TTIs)" and so on). These subframes are the time unit for transmitting 1 channel-encoded data packet, and serve as the unit of processing in, for example, scheduling, link adaptation, retransmission control (HARQ (Hybrid Automatic Repeat reQuest)) and so on.

A radio base station controls the allocation (scheduling) of data for a user terminal, and reports the schedule of data to the user terminal using downlink control information (DCI). The user terminal monitors the downlink control channel (PDCCH) in which the downlink control information is transmitted, performs receiving processes (demodulation process, decoding process, etc.), and controls receipt of DL data and/or transmission of uplink data based on downlink control information that is received.

the transmission of a downlink control channel (PDCCH/EPDCCH) is controlled by using an aggregation of one or more control channel elements (CCEs/ECCEs). Furthermore, each control channel element is comprised of a plurality of resource element groups (REGs/EREGs). Resource element groups are also used when control channels are mapped to resource elements (REs).

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall description, Stage 2 (Release 8)," April, 2010

SUMMARY OF INVENTION

Technical Problem

Future radio communication systems (for example, LTE Rel. 14, 15 or later versions, 5G, NR, etc.) are assumed to control data scheduling based on different configurations than existing LTE systems (for example, LTE Rel. 13 or earlier versions). To be more specific, future radio communication systems are required to support flexible use of numerologies and frequencies, and realize dynamic frame formats. A "numerology" refers to, for example, a set of communication parameters (for example, subcarrier spacing, bandwidth, etc.) applied when transmitting/receiving certain signals.

Also, future radio communication systems are under research to apply different configurations from those of existing LTE systems to control channels and/or data channels. In this case, if the mapping methods of existing LTE systems are applied to the reference signals for use in receiving processes (for example, demodulation process) for these control channels and the like, on as-is basis, the reference signals might not be mapped properly, and a deterioration in the quality of communication and/or a drop in the efficiency of the use of resources and/or the like might cause as problems.

The present invention has been made in view of the above, and it is therefore an object of the present invention to provide a user terminal and a radio communication method that can reduce the deterioration in the quality of communication, the drop in the efficiency of the use of resources and/or the like even when communication is carried out based on different configurations from those of existing LTE systems.

Solution to Problem

According to one aspect of the present invention, a user terminal has a receiving section that receives a downlink control channel, which is transmitted by using a downlink control channel element comprised of a plurality of resource element groups (REGs) and/or one or more REG groups, and a reference signal, which is used to demodulate the downlink control channel, and a control section that controls receipt of the downlink control channel in a certain field, and an allocation pattern of the reference signal is configured in association with at least one of the REG group, the downlink control channel element and the certain field.

Advantageous Effects of Invention

According to the present invention, the deterioration in the quality of communication, the drop in the efficiency of the use of resources and/or the like can be reduced even when communication is carried out based on different configurations from those of existing LTE systems.

BRIEF DESCRIPTION OF DRAWINGS

FIGS. 5A and 5B are diagrams to show other methods of configuring DMRS patterns per REG group;

FIGS. 6A and 6B are diagrams to show other methods of configuring DMRS patterns per REG group;

FIGS. 7A to 7D are diagrams to explain NR-CCEs;

FIGS. 8A and 8B are diagrams to show examples of methods of configuring DMRS patterns per NR-CCE;

FIGS. 11A to 11C are diagrams to show examples of DMRS patterns that respectively correspond to multiple APs;

DESCRIPTION OF EMBODIMENTS

Figure 1:
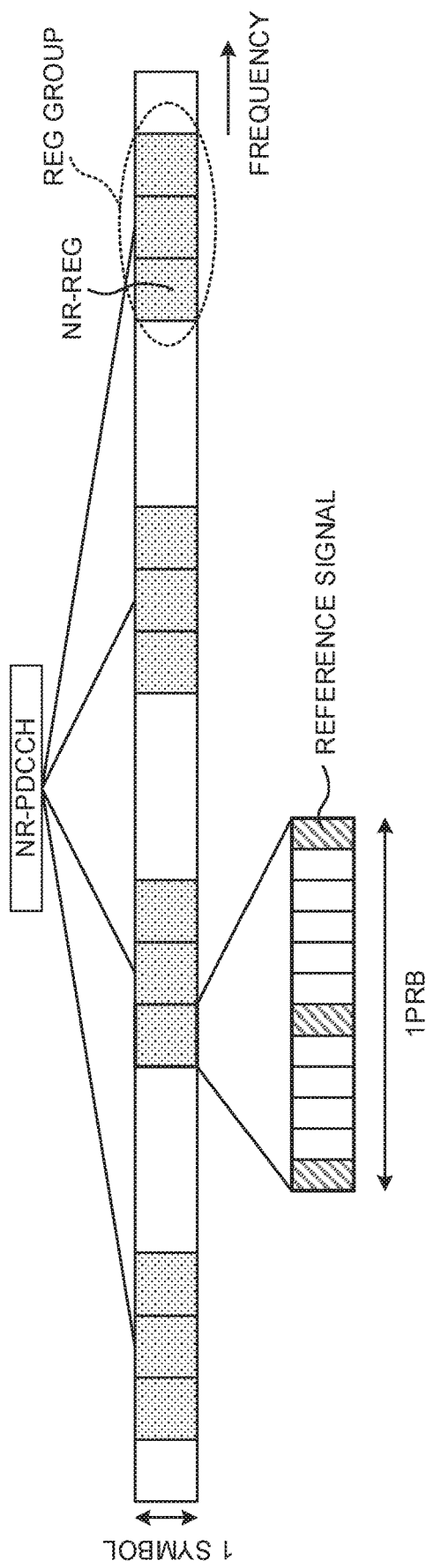
FIG. 1 is a diagram to show examples of REG groups that are each comprised of multiple NR-REGs.

In existing LTE systems, a base station transmits downlink control information (DCI) to a UE using a downlink control channel (for example, PDCCH (Physical Downlink Control Channel), enhanced PDCCH (EPDCCH (Enhanced PDCCH), etc.). Transmission of downlink control information may be interpreted as transmission of downlink control channels.

DCI may be scheduling information, including at least one of, for example, time/frequency resources for scheduling data, transport block information, data modulation scheme information, HARQ retransmission information, information related to demodulation RS, and so on. DCI that schedules receipt of DL data and/or measurements of DL reference signals may be referred to as "DL assignment" or "DL grant," and DCI that schedules transmission of UL data and/or transmission of UL sounding (measurement) signals may be referred to as "UL grant."

DL assignment and/or UL grant may include information related to the resource, sequence, transmission format and so on of the channel for transmitting UL control signals (UCI (Uplink Control Information)) such as HARQ-ACK feedback in response to DL data, channel measurement information (CSI (Channel State Information)) and so on. Also, DCI to schedule UL control signals (UCI (Uplink Control Information)) may be defined apart from DL assignment and UL grant.

A UE is configured to monitor a set of a certain number of prospective downlink control channels. To "monitor" in this case means, for example, attempting to decode every downlink control channel in this set, with respect to a target DCI format. Such decoding is also referred to as "blind decoding (BD)" or "blind detection." A prospective downlink control channel may be referred to as a "prospective BD," a "prospective (E)PDCCH," and so on.

A set of prospective downlink control channels (multiple prospective downlink control channels) to be monitored is also referred to as a "search space." A base station places DCI in a certain prospective downlink control channel included in the search space. The UE performs blind decoding for one or more prospective resources in the search space, and detects DCI addressed to the UE. The search space may be configured by high layer signaling that is common between users, or may be configured by user-specific high layer signaling. Also, two or more search spaces may be configured, for the user terminal, in the same carrier.

In existing LTE (LTE Rel. 8 to 12), a plurality of aggregation levels (ALs) are defined for search spaces for the purpose of link adaptation. The ALs correspond to the numbers of control channel elements (CCEs)/enhanced control channel elements (ECCEs (Enhanced CCEs)) that constitute DCI. Also, a search space is configured so that there are multiple prospective downlink control channels for a given AL. Each prospective downlink control channel is comprised of one or more resource units (CCEs and/or ECCEs).

Cyclic redundancy check (CRC) bits are attached to DCI. The CRC bits are masked (scrambled) using UE-specific identifiers (for example, cell-radio network temporary identifiers (C-RNTIs)) or a system-common identifier. The UE can detect DCI in which the CRC bits are scrambled using the C-RNTI for the subject terminal, and DCI in which the CRC bits are scrambled using a system-common identifier.

Also, a search space may be a common search space, which is configured for UEs on a shared basis, or a UE-specific search space, which is configured for an individual UE. In the UE-specific search space for the existing LTE PDCCH, the ALs (=the numbers of CCEs) are 1, 2, 4 and 8. The prospective numbers of BDs defined in association with the ALs=1, 2, 4 and 8 are 6, 6, 2 and 2, respectively.

Now, 5G/NR is required to support flexible use of numerologies and frequencies, and realize dynamic frame formats. Here, a numerology refers to a set of frequency-domain and/or time domain-communication parameters (for example, at least one of the subcarrier spacing (SCS), the bandwidth, the duration of symbols, the duration of cyclic prefixes (CPs), the duration of transmission time intervals (TTIs), the number of symbols per TTI, the format of radio frames, the filtering process, the windowing process and so on).

Furthermore, envisaging 5G/NR, a new PDCCH (hereinafter referred to as "NR-PDCCH") constitution is under research. For example, study is in progress to use resource element groups (REGs) as certain units (for example, fundamental units/basic units) to constitute an NR-PDCCH. To be more specific, an REG (hereinafter also referred to as "NR-REG") is constituted by certain resource blocks (for example, 1 PRB) in a certain period (for example, 1 symbol). Also, 1 NR-PDCCH may be mapped across multiple symbols and/or multiple PRBs.

When an NR-REG is comprised of 1 PRB in 1 symbol, receiving processes (for example, demodulation process) for NR-PDCCHs may be performed by using demodulation reference signals (for example, DMRSs). From the perspective of improving the accuracy of channel estimation of NR-PDCCHs, although it may be possible to increase reference signals to allocate to REs (for example, 12 REs) in an NR-REG, allocating reference signals to more resources might lead to increasing the overhead, and using fewer resources for the allocation of downlink control channels. Meanwhile, if there are few resources for allocating reference signals, the accuracy of channel estimation might deteriorate, which may lead to a degradation in the quality of communication.

So, in order to improve the accuracy of channel estimation, research is in progress on grouping multiple NR-REGs in NR-PDCCH processing. For example, it is possible to group a plurality of NR-REGs and perform receiving processes, such as channel estimation, in NR-REG-group units.

To be more specific, a base station applies the same precoding process (the same precoder) to NR-REGs included in the same REG group. A UE assumes that the same precoder is applied in an REG group, so that the UE can perform receiving processes by averaging the channel estimation results derived by using the RSs in the REG group. By means of this configuration, it is possible to perform channel estimation in NR-PDCCH processing by using reference signals (hereinafter also referred to as "DMRSs") included in a number of NR-REGs (PRBs), so that the accuracy of channel estimation can be improved. Obviously, the UE may perform receiving processes by using different channel estimation results, per REG, without finding the average of channel estimation results derived by using RSs in an REG group, or the UE may perform receiving processes by finding the average of channel estimation results obtained by using only part of a number of REGs included in an REG group.

From the perspective of averaging the accuracy of channel estimation using DMRSs included in each NR-REG, preferably, multiple (for example, at least 2) NR-REGs that constitute an REG group are allocated contiguously or close to each other in the frequency domain and/or the time domain. Note that an REG group may be referred to as an "REG bundle," an "REG bundling," a "super-REG," or a "sub-CCE."

Figure 2:
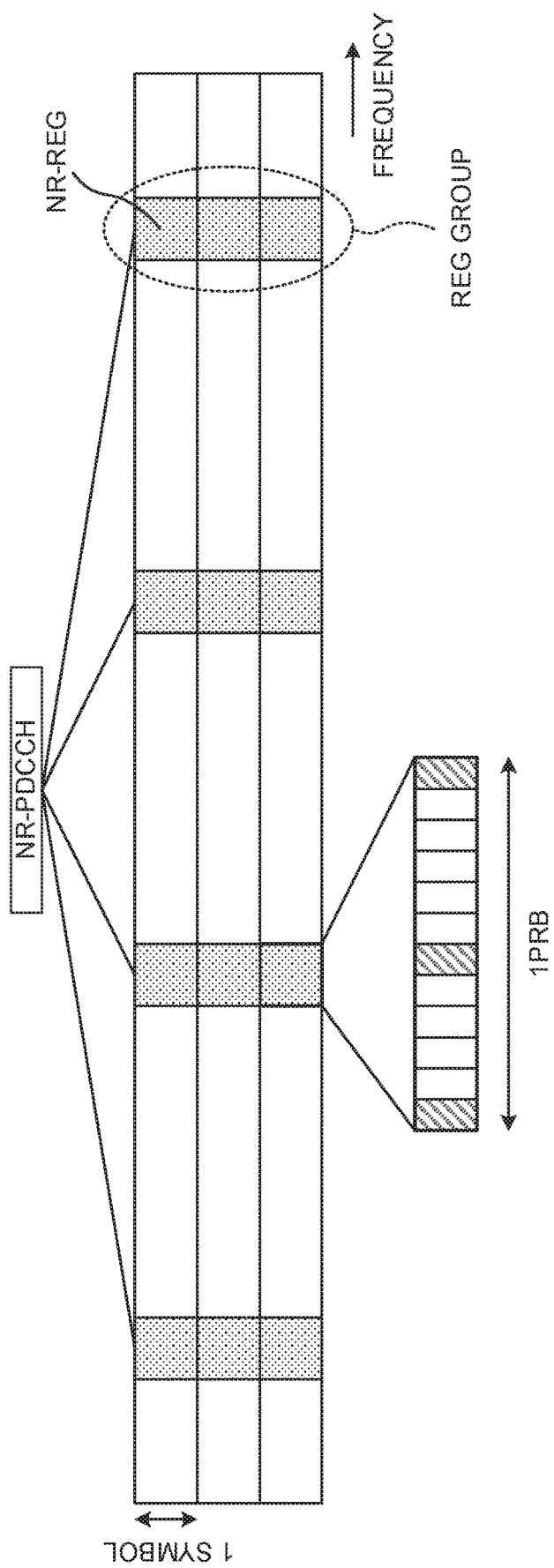
FIG. 2 is a diagram to show other examples of REG groups that are each comprised of multiple NR-REGs.

FIG. 1 and FIG. 2 show examples of REG groups, each comprised of a certain number of NR-REGs. FIG. 1 shows a case where a number of NR-REGs included in the same REG group are allocated contiguously in the frequency direction, and FIG. 2 shows a case where NR-REGs included in the same REG group are allocated contiguously in the time direction. The same precoder may be applied to a number of NR-REGs included in the same REG group. Also, by using reference signals (for example, DMRSs) mapped to each NR-REG included in the same REG group, channel estimation may be performed throughout the REG group (by finding the average of the DMRSs of individual NR-REGs).

Note that FIG. 1 and FIG. 2 show cases where 3 NR-REGs are included in the same REG group, but the number of NR-REGs that constitute an REG group is not limited to 3. Also, every REG group may be formed with a different number of NR-REGs.

In this way, while studies are underway to perform receiving processes per REG group, which bundles a number of NR-REGs, the problem lies in how to configure reference signal allocation patterns (hereinafter referred to as "DMRS patterns"). In existing LTE systems, DMRS patterns are defined on a per PRB basis. It may be possible to define DMRS patterns per PRB (or per NR-REG) by applying the DMRS mapping method of existing LTE systems also to the DMRS that is used to demodulate an NR-PDCCH.

However, in the event an NR-PDCCH is transmitted by using REG-group units, which are each comprised of a number of NR-REGs included contiguously in the frequency domain and/or in the time domain, applying DMRS pattern that are defined based on PRB units might lower the efficiency of the use of resources.

Figure 3A:
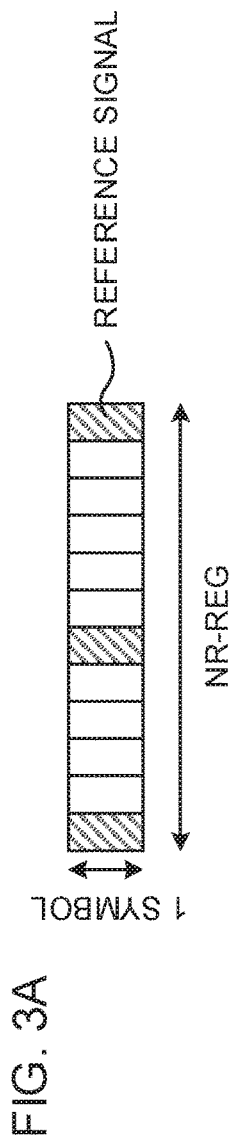
FIG. 3A is a diagram to show a DMRS pattern that is defined based on PRB units.
Figure 3B:
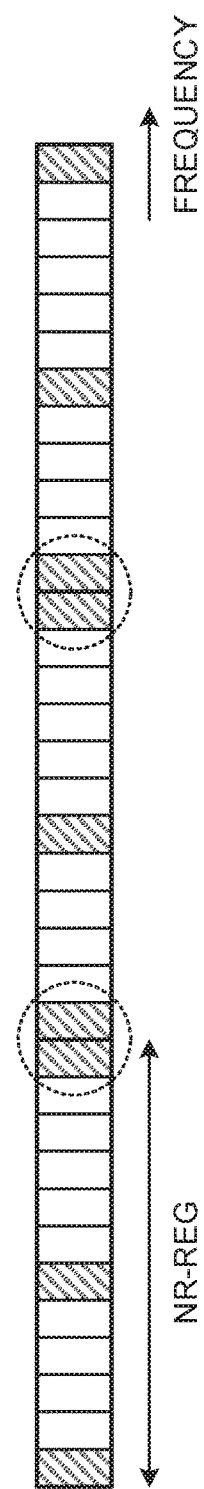
FIGS. 3B and 3C are diagrams to show cases where DMRS patterns defined based on PRB units are applied to REG groups.
Figure 3C:
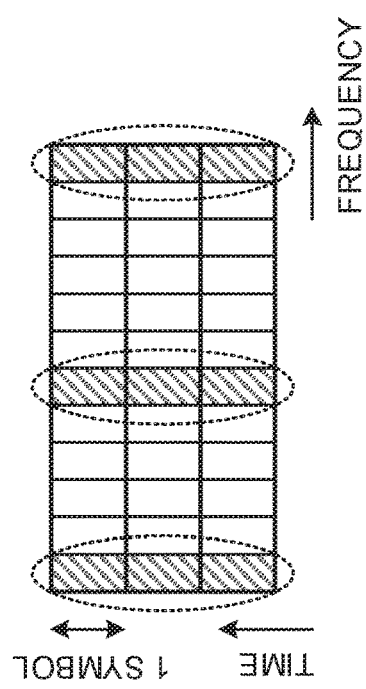

FIG. 3 show cases in which DMRS patterns that are defined based on PRB (or NR-REG) units are applied to REG groups that are each comprised of 3 NR-REGs. FIG. 3A shows a DMRS pattern, defined based on PRB (NR-REG) units. FIG. 3B shows a case where the mapping pattern of FIG. 3A is applied to REG groups, each comprised of 3 NR-REGs that are allocated contiguously in the frequency direction. FIG. 3C shows a case where the mapping pattern of FIG. 3A is applied to REG groups, each comprised of 3 NR-REGs that are allocated contiguously in the frequency direction.

Referring to FIG. 3A, the DMRS is defined so that DMRSs are mapped so as to be distributed in 1 PRB (12 resource elements (or subcarriers)). To be more specific, in this PRB, DMRSs are mapped to subcarriers at both ends and the central subcarrier in the frequency direction. In the event receiving processes such as channel estimation are performed in units of PRBs, channel estimation can be performed properly by distributing and allocating DMRSs within a PRB, as shown in FIG. 3A.

In FIG. 3B, NR-REGs, to which the DMRS pattern of FIG. 3A is applied, are allocated contiguously in the frequency direction, so that contiguous DMRSs are mapped to the boundaries (adjacent resource elements) of multiple NR-REGs. In FIG. 3C, NR-REGs, to which the DMRS pattern of FIG. 3A is applied, are allocated contiguously in the frequency direction, so that contiguous DMRSs are mapped to the boundaries (adjacent resource elements) of multiple NR-REGs.

In FIGS. 3B and 3C, a number of contiguous DMRSs (dotted-line parts in the figures) that are allocated to the boundaries of different NR-REGs show similar channel states. Therefore, from the perspective of performing receiving processes per REG group, the need for allocating a number of DMRSs contiguously (or the effect of allocating contiguous DMRSs) is low. That is, when DMRS patterns that are defined based on PRB (or NR-REG) units as in existing LTE systems are applied to the transmission of an NR-PDCCH, for which receiving processes are controlled in units of REG groups, there is a potential for a drop in the efficiency of the use of resources.

The present inventors have focused on the point that using existing DMRS patterns when NR-PDCCH receiving processes are performed for each REG group leads to a drop in the efficiency of the use of resources, and come up with the idea of configuring reference signal allocation patterns per REG group.

Also, envisaging 5G/NR, studies are in progress to form an NR-PDCCH with one or more CCEs (NR-CCEs) and form an NR-CCE with multiple NR-REGs or one or more REG groups. In the event an NR-PDCCH is transmitted, a number of REGs and/or REG groups included in an NR-CCE may be allocated contiguously in the frequency and/or the time direction. In this case, if DMRS patterns are defined based on NR-REG or REG-group units, DMRSs concentrate unevenly on the boundaries of multiple NR-REGs or the boundaries of multiple REG groups included in the NR-CCE, so that there is a potential for a drop in the efficiency of the use of resources.

Therefore, the present inventors have focused on the point that there are cases where NR-REGs or REG groups that are contiguous in the frequency and/or the time direction constitute an NR-CCE, and come up with the idea of configuring allocation patterns for reference signals for use in NR-PDCCH receiving processes, on a per NR-CCE basis.

In addition, in 5G/NR, it is not the case communication is carried out by using the entire system band, and communication may be controlled by configuring certain frequency and/or time fields (hereinafter also referred to as "certain fields"), dynamically or semi-statically, depending on the use of communication, the communicating environment and so on. For example, downlink control information (NR-PDCCH) for a given UE does not necessarily have to be allocated over the entire system band and transmitted, and research is underway to control the transmission of NR-PDCCHs by configuring certain fields. For example, cases might occur where, a number of REGs, REG groups or NR-CCEs included in a certain field are allocated contiguously in the frequency and/or the time direction. In this case, if DMRS patterns are defined based on NR-REG, REG group or NR-CCE units, DMRSs might concentrate unevenly on the boundaries of multiple REGs included in a certain frequency field, the boundaries of multiple REG groups, the boundaries of multiple NR-CCEs and so on, so that there is a potential for a drop in the efficiency of the use of resources.

Therefore, the present inventors have focused on the point that cases occur in which NR-REGs, REG groups or NR-CCEs are allocated contiguously in the frequency and/or the time direction in a certain field that serves as an NR-PDCCH allocating field, and come up with the idea of configuring allocation patterns for reference signals for use in NR-PDCCH receiving processes, per certain field.

Now, embodiments of the present invention will be described below in detail with reference to the accompanying drawings. The configurations according to each embodiment may be applied individually or may be applied in combination. Also, with the following description, cases will be illustrated in which an REG group is comprised of 3 NR-REGs, but the number of NR-REGs to constitute an REG group may be configured as appropriate.

Note that DMRS patterns for use for demodulating NR-PDCCH will be described in the following description, but the scope to which the present embodiment can be applied is not limited to this. For example, the present embodiment may be applied to DMRSs that are used to demodulate other signals (downlink shared channel, etc.). Alternatively, the present embodiment may be applied to DMRSs that are used to demodulate UL signals (for example, NR-PUCCH and/or NR-PUSCH). For example, in the UL, DMRS patterns may be configured per transmission unit (resource unit) based on which a base station performs receiving processes (for example, demodulation process) and/or a UE performs transmission processes (for example, precoding process). When applying to the UL, UL reference signal (UL-DMRS) patterns may be defined in association with at least one of UL-RB groups (RB bundling), UL-CCEs and UL-control resource sets that serve as UL transmission units. Note that the UL transmission unit for the UL may be the same as the DL transmission unit, or may be designed by changing the DL transmission unit. Also, the UL transmission unit is not limited to those described above. When applying the present embodiment to UL DMRS patterns, DL in the following description may be replaced with UL.

First Example

According to a first example of the present invention, a case will be explained where DMRS patterns are configured per REG group (or based on REG-group units). The first example is suitable for use in controlling NR-PDCCH processing (transmission process and/or receiving process) by using REG groups, each comprised of a number of NR-REGs that are contiguous in the frequency and/or the time direction.

When configuring DMRS patterns per REG group, DMRS patterns are configured so that DMRSs are distributed and mapped over a number of NR-REGs included in the same REG group. In this case, a DMRS pattern for an REG group may be defined by using DMRS patterns defined based on NR-REG (or PRB) units (pattern generation method 1A). Alternatively, a DMRS pattern for an REG group may be defined regardless of the DMRS pattern defined based on NR-REG (or PRB) units (pattern generation method 2A).

Pattern generation method 1A changes part of a DMRS pattern defined based on NR-REG units so as to configure a DMRS pattern for an REG group. To be more specific, pattern generation method 1A deletes part of the DMRSs included in a number of NR-REGs that constitute an REG group so as to generates a DMRS pattern for the REG group (pattern generation method 1A-1). Alternatively, part of the DMRSs included in a number of NR-REGs that constitute an REG group are shifted to generate a DMRS pattern for the REG group (pattern generation method 1A-2).

Pattern generation method 2A configures DMRS patterns for REG groups independently of the DMRS patterns of NR-REG units. To be more specific, pattern generation method 2A designs a DMRS pattern such that a certain number of DMRSs are distributed and mapped over resources that constitute an REG group (REs of multiple NR-REGs).

Hereinafter, pattern generation method 1A and pattern generation method 2A will be described with reference to the accompanying drawings. Note that the pattern generation methods described below are simply examples, and the number of DMRSs included in an NR-REG and an REG group, the number of DMRSs to delete, the amount of shift to apply to DMRSs and so forth can be changed appropriately and configured.

<Pattern Generation Method 1A-1>

Figure 4A:
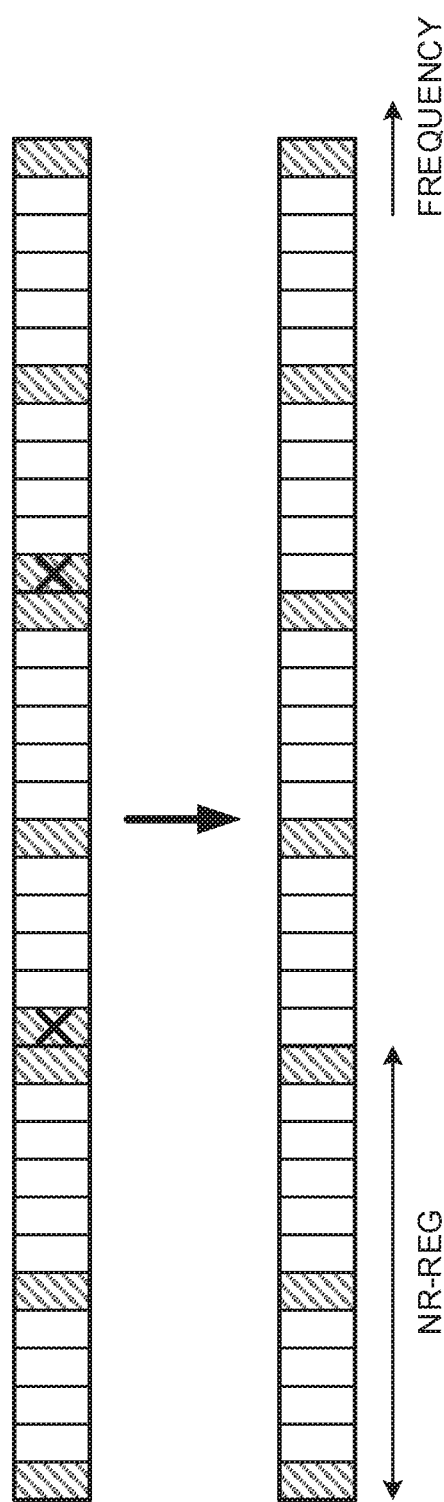
FIGS. 4A and 4B are diagrams to show examples of methods of configuring DMRS patterns per REG group.

FIG. 4A illustrates a case where part of the DMRSs of a number of (3 in this case) NR-REGs, which are contiguous in the frequency direction, are deleted so as to configure a DMRS pattern for an REG group. That is, an REG group is formed on assumption that a DMRS pattern is defined based on NR-REG (or PRB) units, and DMRSs of little need are deleted. Here, DMRSs are mapped contiguously to the boundaries of adjacent NR-REGs (REs at ends of adjacent NR-REGs), Here, one of these contiguous DMRSs is deleted.

As shown in FIG. 4A, at least one of DMRSs that are contiguous is deleted, so that it is possible to prevent part of multiple DMRSs that constitute an REG group from concentrating in spots, and distribute DMRSs. According to pattern generation method 1A-1, it suffices to delete only part of the DMRSs so that at least there are no contiguous DMRSs within an REG group, and the DMRSs to delete are not limited to contiguous DMRSs.

Figure 4B:
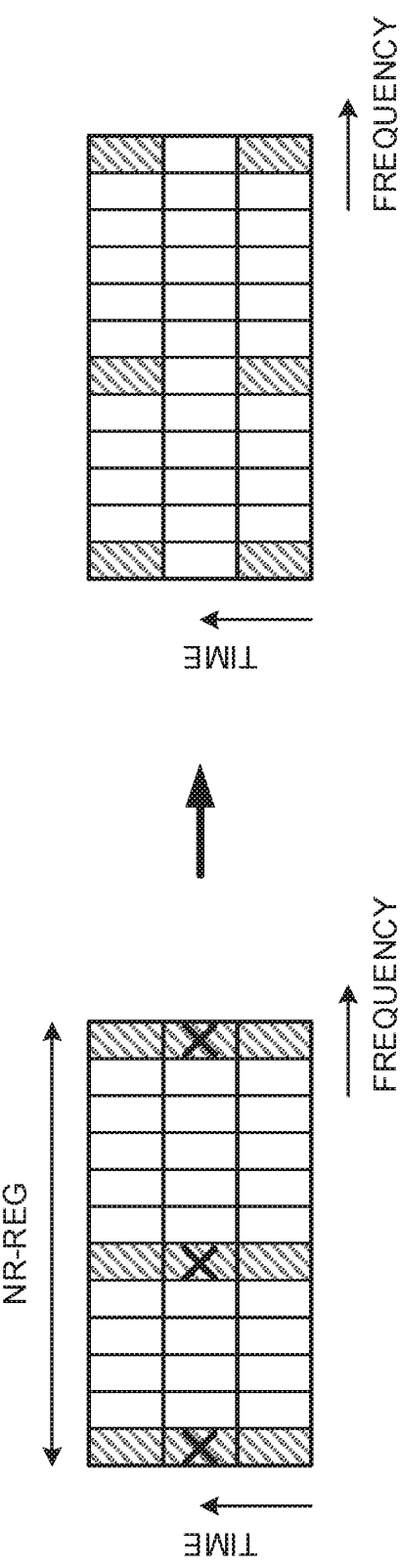

FIG. 4B illustrates a case where part of the DMRSs of a number of (3 in this case) NR-REGs, which are contiguous in the frequency direction, are deleted so as to configure a DMRS pattern for an REG group. That is, an REG group is formed on assumption that a DMRS pattern is defined based on NR-REG (or PRB) units, and DMRSs of little need are deleted. Here, since contiguous DMRSs are mapped across contiguous NR-REGs in the time direction, part of the DMRSs are deleted so as to make the DMRSs non-contiguous.

As shown in FIG. 4, DMRSs that are less useful when channel estimation is performed are deleted, so that the resources associated with these deleted DMRSs can be used transmit other signals (for example, downlink control information), and, consequently, the efficiency of the use of resources can be improved. In addition, since more resources are available for use for downlink control information (for example, NR-PDCCH), the coding rate of the NR-PDCCH can be lowered.

<Pattern Generation Method 1A-2>

FIG. 5A illustrates a case where part of the DMRSs of a number of (3 in this case) NR-REGs, which are contiguous in the frequency direction, are deleted so as to configure a DMRS pattern for an REG group. That is, an REG group is formed on assumption that a DMRS pattern is defined based on NR-REG units, and DMRSs of little need are deleted. When DMRSs are mapped contiguously to the boundaries of adjacent NR-REGs (REs at ends of adjacent NR-REGs), one of these contiguous DMRSs is deleted. Here a case is shown where 2 adjacent DMRSs are both shifted at the boundaries of NR-REGs.

As shown in FIG. 5A, at least one of contiguous DMRSs is shifted, so that it is possible to distribute DMRSs in an REG group. According to pattern generation method 1A-2, it suffices to only shift some of the DMRS so that at least there are no contiguous DMRSs within an REG group, the DMRSs to shift are not limited to contiguous DMRSs. Preferably, shifts are applied in an REG group, along the frequency direction, so that the gap between different DMRSs is less than or equal to a certain number of REs (for example, 1 RE or 2 REs).

FIG. 5B shows an example case in which a DMRS pattern for a REG group is configured by shifting part of the DMRSs of a number of (3 in this case) NR-REGs that are contiguous in the time direction. That is, an REG group is formed on assumption that a DMRS pattern is defined based on NR-REG (or PRB) units, and DMRSs of little need are deleted. Here, given that contiguous DMRSs are mapped across contiguous NR-REGs in the time direction, part of the DMRSs (here, the DMRSs of some of the NR-REGs) are shifted in the frequency direction so that DMRSs are not contiguous in the time direction in the same frequency field. Note that the DMRSs may be shifted in the time direction, instead of the frequency direction (or in addition to the frequency direction).

As shown in FIG. 5, DMRSs can be distributed within an REG group by shifting DMRSs that are less useful (at least one of adjacent DMRSs) during channel estimation. As a result of this, when NR-PDCCH processing is carried out in REG-group units, the accuracy of channel estimation can be compared to the case where DMRS patterns are defined based on NR-REG units.

<Pattern Generation Method 2A>

FIG. 6A illustrates a case where a DMRS pattern for an REG group, comprised of a number of (3 in this case) NR-REGs that are contiguous in the frequency direction, is designed regardless of the DMRS pattern for NR-REGs. That is, a DMRS pattern for an REG group is designed without taking into account DMRS patterns that are defined based on NR-REG (or PRB) units. In this way, by defining a DMRS pattern for an REG group without considering NR-REG-based DMRS patterns, DMRS patterns can be designed more flexibly.

FIG. 6A shows a case where a DMRS pattern is defined by mapping DMRSs to a number of resources (REs) included in an REG group so that the DMRSs are distributed in the frequency direction. To be more specific, a DMRS pattern is defined so that the gap between each DMRS matches a certain value (here, 5 REs or 5 subcarriers). Note that the number of DMRSs to configure in an REG group is not limited to this.

Also, although FIG. 6A shows a case where the gap between adjacent DMRSs in the REG group is the same (here, 5 REs), the between DMRSs does not necessarily have to be the same. By contrast with this, from the perspective of improving the accuracy of channel estimation by distributing DMRSs, it is preferable to define a DMRS pattern so that the gap between DMRSs is less than a certain number (for example, 1 RE or 2 REs). For example, in a given REG group, there may be a part where the gap between DMRS is 4REs and part where this is 5REs (or 6 REs).

FIG. 6B shows a case where a DMRS pattern is defined by mapping DMRSs to a number of resources (REs) included in an REG group so that the DMRSs are distributed in the frequency direction. To be more specific, a DMRS pattern is defined here so that DMRSs are provided so that the gap between each DMRS matches a certain value (here, 6 REs or 6 subcarriers in the frequency direction in the same symbol, 2 REs or 2 subcarriers in the frequency direction in different symbols, etc.). Note that the number of DMRSs to configure in an REG group is not limited to this. Also, while it is not necessary to allocate DMRSs so that the same gap is maintained between each DMRS, from the perspective of improving the accuracy of channel estimation, it is preferable to define a DMRS pattern so that the gap between different DMRSs is less than or equal to a certain number of REs (for example, 1 RE or 2 REs).

In this way, by defining a DMRS pattern for an REG group without considering NR-REG-based DMRS patterns, DMRS patterns can be designed more flexibly.

Note that the number and arrangement of NR-REGs included in 1 REG group might vary depending on the type of the search space (UE-common or UE-specific), the aggregation level (or the coding rate), the transmission scheme, etc. In this case, different DMRS patterns may be defined depending on the number and arrangement of NR-REGs included in 1 REG group. Also, when a UE monitors a number of prospective PDCCHs that correspond to varying numbers and arrangements of NR-REGs included in 1 REG group, channel estimation may be performed on assumption that different DMRS patterns are used per prospective PDCCH.

<DMRS Pattern Configuration>

DMRS patterns in REG groups may be defined in advance on a fixed basis in the specification or the like (method 1A), or certain DMRS patterns may be reported from a base station to a UE (method 2A). Furthermore, method 1A and method 2A may be switched and applied.

In the event method 1A is used, when a certain REG group (also referred to as an "REG group pattern," "REG-bundling pattern," etc.) is configured from the base station, the UE identifies the predefined DMRS pattern that corresponds to the REG group. In this manner, by defining fixed DMRS patterns in association with REG groups in advance, DMRS patterns' signaling and the like can be omitted, and the UE can easily identify DMRS patterns.

Only 1 DMRS pattern that correspond to REG groups may be defined, or DMRS patterns may be defined per different REG group (per REG group index). For example, different DMRS patterns may be defined in advance depending on, for example, the number of NR-REGs included in an REG group, and the like. Alternatively, a basic DMRS pattern that serves as a base may be defined in association with an REG group comprised of a certain number of NR-REGs, and DMRS patterns may be derived by expanding and/or reducing this basic DMRS pattern depending on the number of NR-REGs included in each REG group.

In the event method 2A is used, a number of DMRS patterns are prepared for an REG group, and a certain DMRS pattern is configured for the UE. For example, the base station reports information about a certain DMRS pattern to the UE by using at least one of higher layer signaling (for example, RRC signaling and/or broadcast information), MAC layer signaling, and physical layer signaling (for example, downlink control information).

Alternatively, a table may be provided, in which a number of prospective DMRS patterns and bit values are associated with REG groups, and certain bit values may be reported from the base station to the UE. The UE identifies the DMRS patterns based on the bit values reported from the base station. In addition, the base station may configure information about the multiple prospective DMRS patterns defined in the table, in the UE, by using higher layer signaling or the like.

According to method 2A, certain DMRS patterns are reported from the base station to the UE, so that suitable DMRS patterns can be used depending on the communicating environment (communication mode).

Second Example

Now, with a second example of the present invention, a case will be described below in which DMRS patterns are configured per NR-CCE (or based on NR-CCE units).

As mentioned above, envisaging future radio communication systems, studies are in progress to form an NR-PDCCH with one or more CCEs (NR-CCEs) and form an NR-CCE with multiple NR-REGs or one or more REG groups.

FIGS. 7A to 7D show examples of NR-CCE transmission methods. A number of (3 in this case) NR-REGs or REG groups constitute an NR-CCE. In the example arrangement shown in FIG. 7A, NR-REGs or REG groups are allocated only to the first symbol, and 3 NR-REGs or REG groups that are contiguous in the frequency domain constitute an NR-CCE. With this arrangement, it is possible to complete blind decoding in symbol units. Also, different precoding (or beamforming) can be applied to different NR-CCEs allocated in different symbols, so that pre-encoded NR-CCEs can be multiplexed in time.

In the example arrangement shown in FIG. 7B, NR-REGs or REG groups are allocated only to the first symbol, and an NR-CCE is comprised of 3 NR-REGs or REG groups that are discretely allocated in the frequency domain. This arrangement can provide a frequency diversity gain with the NR-CCE, in addition to having the advantage of the arrangement of FIG. 7A.

In the exemplary arrangement shown in FIG. 7C, NR-REGs are arranged in the same frequency location in the first to third symbols. In this arrangement, unlike FIGS. 7A and 7B, 1 NR-CCE is transmitted by using multiple symbols, so that received signal energy can be doubled by the number of symbols.

In the exemplary arrangement shown in FIG. 7D, NR-REGs are arranged in the first to third symbols so as not to overlap with each other in the frequency direction. This arrangement can provide a frequency diversity gain with the NR-CCE, in addition to having the advantage of the arrangement of FIG. 7C.

In FIGS. 7A and 7C described above, multiple REGs and/or REG groups included in an NR-CCE are allocated contiguously in the frequency and/or the time direction. In this case, if DMRS patterns are defined based on NR-REG (PRB) and/or REG-group units, DMRSs are mapped to concentrate on the boundaries of multiple REGs included in the NR-CCE or the boundaries of REG groups, so that there is a potential for a drop in the efficiency of the use of resources.

Therefore, the second example configures DMRS patterns per NR-CCE (or based on NR-CCE units) (see FIGS. 8A and 8B). FIG. 8 show cases in which DMRS patterns are defined in association with NR-CCEs, each comprised of number of NR-REGs or REG groups. FIG. 8A shows a case where a number of NR-REGs or REG groups that constitute an NR-CCE are allocated contiguously in the frequency direction, and FIG. 8B shows a case where a number of NR-REGs or REG groups that constitute an NR-CCE are allocated contiguously in the time direction. Note that the second aspect is suitable for use when transmitting an NR-CCE comprised of a number of NR-REGs and/or REG groups that are contiguous in the frequency and/or the time direction, but this is by no means limiting.

When configuring DMRS patterns per NR-CCE, DMRS patterns are configured so that DMRSs are distributed and mapped over a number of NR-REGs or REG groups included in the same NR-CCE. In this case, DMRS patterns for NR-CCEs may be defined based on DMRS patterns that are defined based on REG or REG-group units (pattern generation method 1B). Alternatively, a DMRS pattern for an REG group may be defined regardless of the DMRS pattern defined based on REG or REG-group units (pattern generation method 2B).

Pattern generation method 1B configures DMRS patterns for NR-CCEs by using DMRS patterns that are defined based on NR-REG or REG-group units. To be more specific, pattern generation method 1B deletes part of the DMRSs included in a number of NR-REGs or REG groups that constitute an NR-CCE so as to generates a DMRS pattern for the NR-CCE (pattern generation method 1B-1). By this means, it is possible to use resources that correspond to DMRSs of little need, for downlink control information and so on, so that the efficiency of the use of resources can be improved.

Alternatively, part of the DMRSs included in a number of NR-REGs or REG groups that constitute an NR-CCE are shifted to generate a DMRS pattern for the NR-CCE (pattern generation method 1B-2). By this means, DMRSs can be distributed and arranged within an NR-CCE, so that the accuracy of channel estimation can be improved.

Pattern generation method 2B configures DMRS patterns for NR-CCEs independently of the DMRS patterns of NR-REG or REG-group units. To be more specific, pattern generation method 2B designs a DMRS pattern such that a certain number of DMRSs are distributed and mapped over resources that constitute an NR-CCE (REs of multiple NR-REGs or REG groups).

In this way, by configuring DMRS patterns on a per NR-CCE basis, DMRSs can be distributed and mapped even when a number of NR-REGs and/or REG groups included in an NR-CCE are allocated contiguously.

<DMRS Pattern Configuration>

DMRS patterns in NR-CCEs may be defined in advance on a fixed basis in the specification or the like (method 1B), or certain DMRS patterns may be reported from a base station to a UE (method 2B). Furthermore, method 1B and method 2B may be switched and applied.

In the event method 1B used, the UE identifies DMRS patterns that are defined in advance in association with NR-CCEs. In this manner, by defining fixed DMRS patterns in association with NR-CCEs in advance, DMRS patterns' signaling and the like can be omitted, and the UE can easily identify DMRS patterns.

Only 1 DMRS pattern that correspond to NR-CCEs may be defined, or DMRS patterns may be defined per different NR-CCE (per NR-CCE index). For example, different DMRS patterns may be defined in advance depending on, for example, the number of NR-REGs or REG groups included in an NR-CCE, and the like. Alternatively, a basic DMRS pattern that serves as a base may be defined in association with an NR-CCE comprised of a certain number of NR-REGs or REG groups, and DMRS patterns may be derived by expanding and/or reducing this basic DMRS pattern depending on the number of NR-REGs or REG groups included in each NR-CCE.

In the event method 2B is used, a number of DMRS patterns are prepared for an NR-CCE, and a certain DMRS pattern is configured for the UE. For example, the base station reports information about a certain DMRS pattern to the UE by using at least one of higher layer signaling (for example, RRC signaling and/or broadcast information), MAC layer signaling, and physical layer signaling (for example, downlink control information).

Alternatively, a table may be provided, in which a number of prospective DMRS patterns and bit values are associated with NR-CCEs, and certain bit values may be reported from the base station to the UE. The UE identifies DMRS patterns based on the bit values reported from the base station. In addition, the base station may configure information about the multiple prospective DMRS patterns defined in the table, in the UE, by using higher layer signaling or the like.

According to method 2B, certain DMRS patterns are reported from the base station to the UE, so that suitable DMRS patterns can be used depending on the communicating environment (communication mode).

Third Example

With a third example of the present invention, a case will be described below in which DMRS patterns are configured per certain field (or based on certain field units) configured for NR-PDCCH transmission.

Figure 9B:
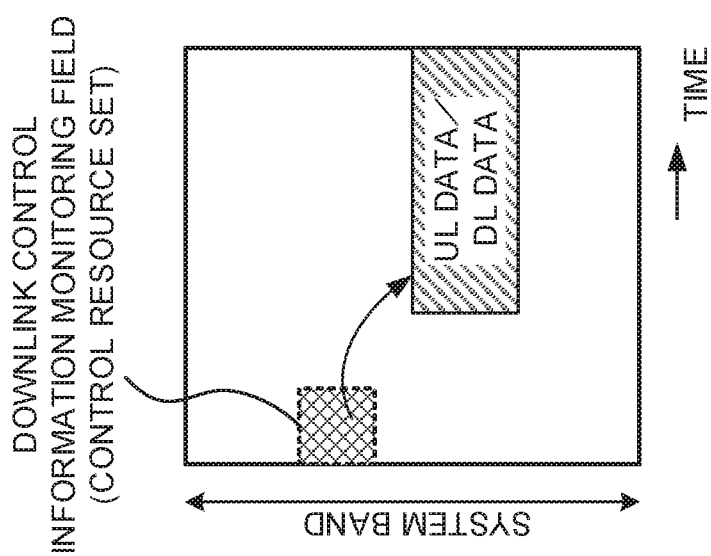
FIG. 9B is a diagram to show an example of a downlink control channel transmission method for a future communication system.
Figure 9A:
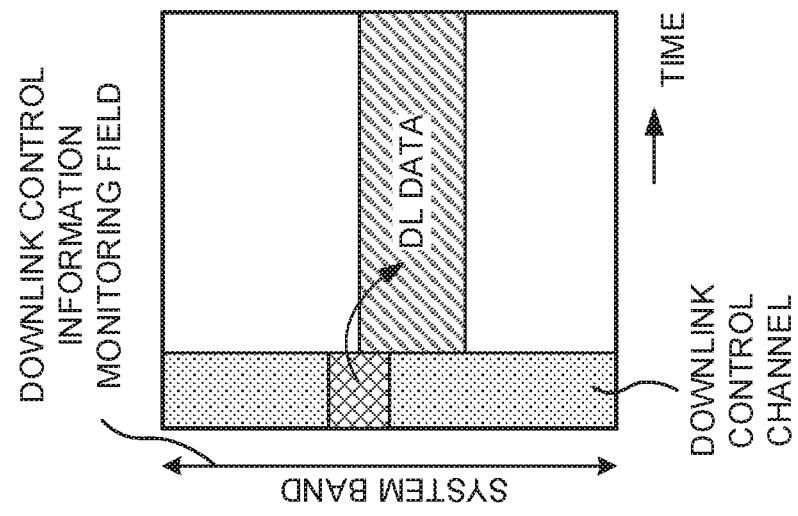
FIG. 9A shows an example of an existing downlink control channel transmission method.

Now, in conventional LTE systems, a downlink control channel (or downlink control information) is transmitted by using the whole system bandwidth (see FIG. 9A). Therefore, regardless of whether or not DL data is allocated in each subframe, a UE needs to monitor the whole system bandwidth to receive (blind-decode) downlink control information.

By contrast with this, in future radio communication systems, communication may not be performed using the whole system band in a certain carrier at all times, and it is more likely that communication will be controlled by configuring certain frequency fields (also referred to as "frequency bands"), dynamically or semi-statically, depending on the purpose of communication and/or the communicating environment. For example, in future radio communication systems, downlink control information for a given UE needs not be necessarily allocated over the whole system band and transmitted, and, instead, it may be possible to configure a certain frequency field to control transmission of downlink control information (see FIG. 9B).

A radio resource that is comprised of a certain frequency field and time field configured for a UE may be referred to as a "control resource set (CORSET)," a "control subband," a "search space set," a "search space resource set," a "control field," a "control subband," an "NR-PDCCH field," and so on.

A control resource set is comprised of certain resource units, and can be configured to be equal to or less than the system bandwidth (carrier bandwidth) or the maximum bandwidth where the user terminal can perform receiving processes. For example, a control resource set may be comprised of one or more RBs (PRBs and/or VRBs) in the frequency direction. Here, an RB refers to, for example, a frequency resource block unit comprised of 12 subcarriers. The UE can monitor for downlink control information within the range of the control resource set, and control receipt. By this means, in the receiving process of downlink control information, the UE does not have to keep monitoring the whole system bandwidth at all times, so that its power consumption can be reduced.

Also, a control resource set refers to resources where downlink control information is mapped, or a resource frame for accommodating the NR-PDCCH. Furthermore, a control resource set can be defined depending on the size of resource units. For example, the size of 1 control resource set can be configured to be an integer multiple of the size of a resource unit. Also, a control resource set may be comprised of consecutive or non-consecutive resource units.

A resource unit refers to the fundamental unit of resources to allocate to the NR-PDCCH, and may be one of an NR-CCE, an NR-REG and REG group.

Now, in a certain field (control resource set), a number of NR-REGs, REG groups or NR-CCEs may be allocated contiguously in the frequency and/or the time direction. In this case, if a DMRS pattern is defined based on NR-REG, REG group or NR-CCE units, DMRSs might concentrate on the boundaries of multiple REGs included in the certain field, the boundaries of multiple REG groups or the boundaries of multiple NR-CCEs, there is a potential for a drop in the efficiency of the use of resources.

Figure 10:
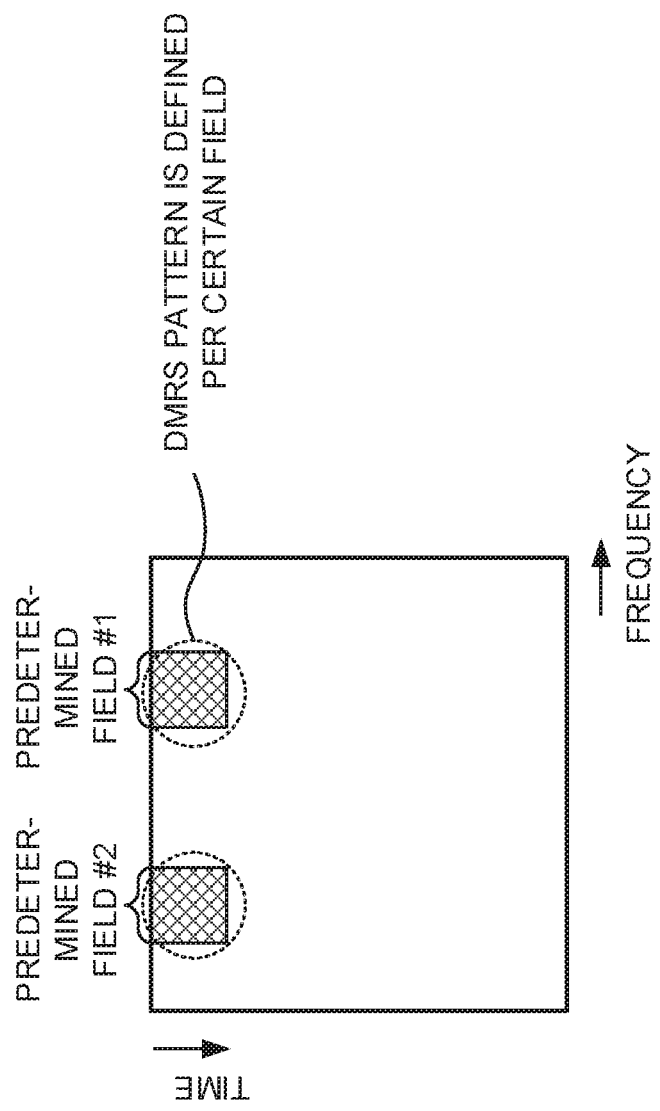
FIG. 10 is a diagram to show an example of the method of configuring DMRS patterns per certain field.

Therefore, with the third example, DMRS patterns are configured per certain field (or based on certain field units) (see FIG. 10). In FIG. 10, DMRS patterns are defined in association with certain fields #1 and #2. These DMRS patterns corresponding to certain fields #1 and #2 may be the same, or different DMRS patterns may be configured depending on parameters (for example, the frequency field, the number of NR-REGs that can be configured, the number of REG groups, the number of NR-CCEs, etc.) of the certain field.

Note that a third example is suitable for use when at least one of a number of NR-REGs, a number of REG groups and a number of NR-CCEs are allocated contiguously in the frequency and/or the time direction, in a certain field, but this is by no means limiting.

When DMRS patterns are configured per certain field (control resource set), the DMRS patterns are configured so that DMRSs are mapped so as to be distributed over multiple NR-REGs, REG group or NR-CCEs included in this certain field. In this case, a DMRS pattern for a certain field may be defined based on DMRS patterns that are defined based on REG, REG-group or NR-CCE units (pattern generation method 1C). Alternatively, a DMRS pattern for a certain field may be defined regardless of DMRS patterns that are defined based on REG, REG-group or NR-CCE units (pattern generation method 2C).

In pattern generation method 1C, a DMRS pattern for a certain field is configured based on a DMRS pattern that is defined based on NR-REG, REG group or NR-CCE units.

To be more specific, pattern generation method 1C deletes part of the DMRSs included in a number of NR-REGs, REG groups or NR-CCEs that are transmitted in a certain field so as to generates a DMRS pattern for the certain field (pattern generation method 1C-1). By this means, it is possible to use resources that correspond to DMRSs of little need, for downlink control information and so on, so that the efficiency of the use of resources can be improved.

Alternatively, part of the DMRSs included in a number of NR-REGs, REG groups or NR-CCEs that are transmitted in a certain field are shifted to generate a DMRS pattern for the certain field (pattern generation method 1C-2). By this means, it is possible to distribute and allocate DMRSs within an NR-CCE, so that the accuracy of channel estimation can be improved.

Pattern generation method 2C configures DMRS patterns for certain fields independently of the DMRS patterns of NR-REG, REG-group or NR-CCE units.

To be more specific, pattern generation method 2C designs a DMRS pattern such that a certain number of DMRSs are distributed and mapped over resources that are included in a certain field (REs of multiple NR-REGs, REG groups or NR-CCEs).

In this way, by configuring DMRS patterns on a certain field (control resource set), DMRSs can be distributed and mapped even when at least one of a number of NR-REGs, a number of REG groups and a number of NR-CCEs included in a certain field are allocated contiguously.

<DMRS Pattern Configuration>

DMRS patterns in certain fields may be defined in advance on a fixed basis in the specification or the like (method 1C), or certain DMRS patterns may be reported from a base station to a UE (method 2C). Furthermore, method 1C and method 2C may be switched and applied.

When method 1C is used, the UE identifies DMRS patterns that are defined in advance in association with certain fields. In this manner, by defining fixed DMRS patterns in association with certain fields in advance, DMRS patterns' signaling and the like can be omitted, and the UE can easily identify DMRS patterns.

Only 1 DMRS pattern that correspond to certain fields may be defined, or DMRS patterns may be defined per certain field (per control resource index). For example, different DMRS patterns may be defined in advance depending on the number of NR-REGs that can be arranged in a certain field, the number of REG groups, or the number of NR-CCEs. Alternatively, a basic DMRS pattern that serves as a base may be defined in association with a certain field in which a certain number of NR-REGs, REG groups or NR-CCEs can be allocated, and DMRS patterns may be derived by expanding and/or reducing this basic DMRS pattern depending on the number of NR-REGs, REG groups or NR-CCEs that are transmitted in each certain field.

When method 2C is used, a number of DMRS patterns are prepared for a certain field, and a certain DMRS pattern is configured for the UE. For example, the base station reports information about a certain DMRS pattern to the UE by using at least one of higher layer signaling (for example, RRC signaling and/or broadcast information), MAC layer signaling, and physical layer signaling (for example, downlink control information).

Alternatively, a table may be provided, in which a number of prospective DMRS patterns and bit values are associated with certain fields, and certain bit values may be reported from the base station to the UE. The UE identifies DMRS patterns based on the bit values reported from the base station. In addition, the base station may configure information about the multiple prospective DMRS patterns defined in the table, in the UE, by using higher layer signaling or the like.

According to method 2C, certain DMRS patterns are reported from the base station to the UE, so that suitable DMRS patterns can be used depending on the communicating environment (communication mode).

Fourth Example

As described above, a DMRS pattern has only to be defined based on at least one of an REG group, an NR-CCE and a certain field. In this case, respective DMRS patterns may be defined for an REG group, an NR-CCE and a certain field, in the specification. Alternatively, a basic DMRS pattern that serves as a base may be defined for one of the resource units of an REG group, an NR-CCE and a certain field. In this case, DMRS patterns for the other resource units may be determined by expanding and/or reducing the basic DMRS pattern.

Also, one or more DMRS patterns may be configured for each of an REG group, an NR-CCE and a certain field, and information to indicate which DMRS pattern is used for communication may be reported from the base station to the UE. In this case, the base station may report which resource unit the DMRS pattern to use corresponds to (the granularity of the DMRS pattern to use), to the UE, by using at least one of higher layer signaling, MAC layer signaling and physical layer signaling.

For example, the base station reports use of a DMRS pattern that is defined based on REG-group units, to the UE, in a first certain field #1 used to transmit an NR-PDCCH, and reports the use of a DMRS pattern that is defined based on NR-CCE units, to the UE, in a second certain field #2. In this way, by changing the granularity of the DMRS pattern (DMRS pattern corresponding to each resource unit) to use to transmit the NR-PDCCH, the DMRS mapping method can be controlled flexibly depending on the communicating environment and so on.

Fifth Example

When communicating using multiple antennas (antenna ports), DMRSs are configured on a per antenna port basis. When mapping methods for existing LTE systems are used, DMRSs that respectively correspond to a number of antenna ports are mapped per PRB (or NR-REG).

A fifth example of the present invention controls mapping of DMRSs that correspond to a number of antenna ports based on units of at least one of REG groups (REG bundling), NR-CCEs, and certain fields (control resource sets). By this means, when performing NR-PDCCH processing per certain resource unit (for example, per REG group), mapping of DMRSs that correspond to a number of antenna ports can be controlled in REG-group units.

FIG. 11 show examples of methods of mapping DMRSs to each antenna port in REG groups. FIG. 11 shows mapping of DMRSs that respectively correspond to 2 antenna ports, but the number of antenna ports is not limited to 2. In addition, FIG. 11 show cases where an REG group is comprised of 4 NR-REGs, but the number of NR-REGs is not limited to this.

FIG. 11A shows a case of using a DMRS pattern defined based on PRB (NR-REG) units (mapping method for existing LTE systems). As shown in FIG. 11A, DMRS that each correspond to a first antenna port (AP #1) or a second antenna port (AP #2) are mapped to each NR-REG. In this case, the DMRS corresponding to AP #1 and the DMRS corresponding to AP #2 mapped over the REG group may be mapped non-uniformly.

FIG. 11B illustrates a case where each AP's DMRS pattern is defined per REG group, instead of defining each AP's DMRS pattern per REG group. A case is shown here where the DMRS corresponding to AP #1 and the DMRS corresponding to AP #2 are mapped so that these DMRSs are distributed over the REG group and allocated. The number of DMRSs corresponding to AP #1 included in each NR-REG and the number of DMRS corresponding to AP #2 may be configured different. This makes it possible to flexibly configure the mapping of DMRSs to each AP.

FIG. 11C shows a case where DMRSs corresponding to certain APs are selectively (for example, locally) mapped to a number of NR-REGs that constitute an REG group. Here, one of the DMRS for AP #1 and the DMRS for AP #2 is mapped to each NR-REG constituting the REG group. For example, DMRSs that correspond to different APs are mapped to adjacent NR-REGs. In this manner, by mapping DMRSs that correspond to certain APs per NR-REG included in an REG group, it is possible to concentrate gather DMRSs of certain APs in a relatively narrow band and/or time, so that the accuracy of channel estimation in this band and/or time can be improved.

(Radio Communication System)

Now, the structure of the radio communication system according to one embodiment of the present invention will be described below. In this radio communication system, communication is carried out using one of the radio communication methods according to the herein-contained embodiments of the present invention, or a combination of these.

Figure 12:
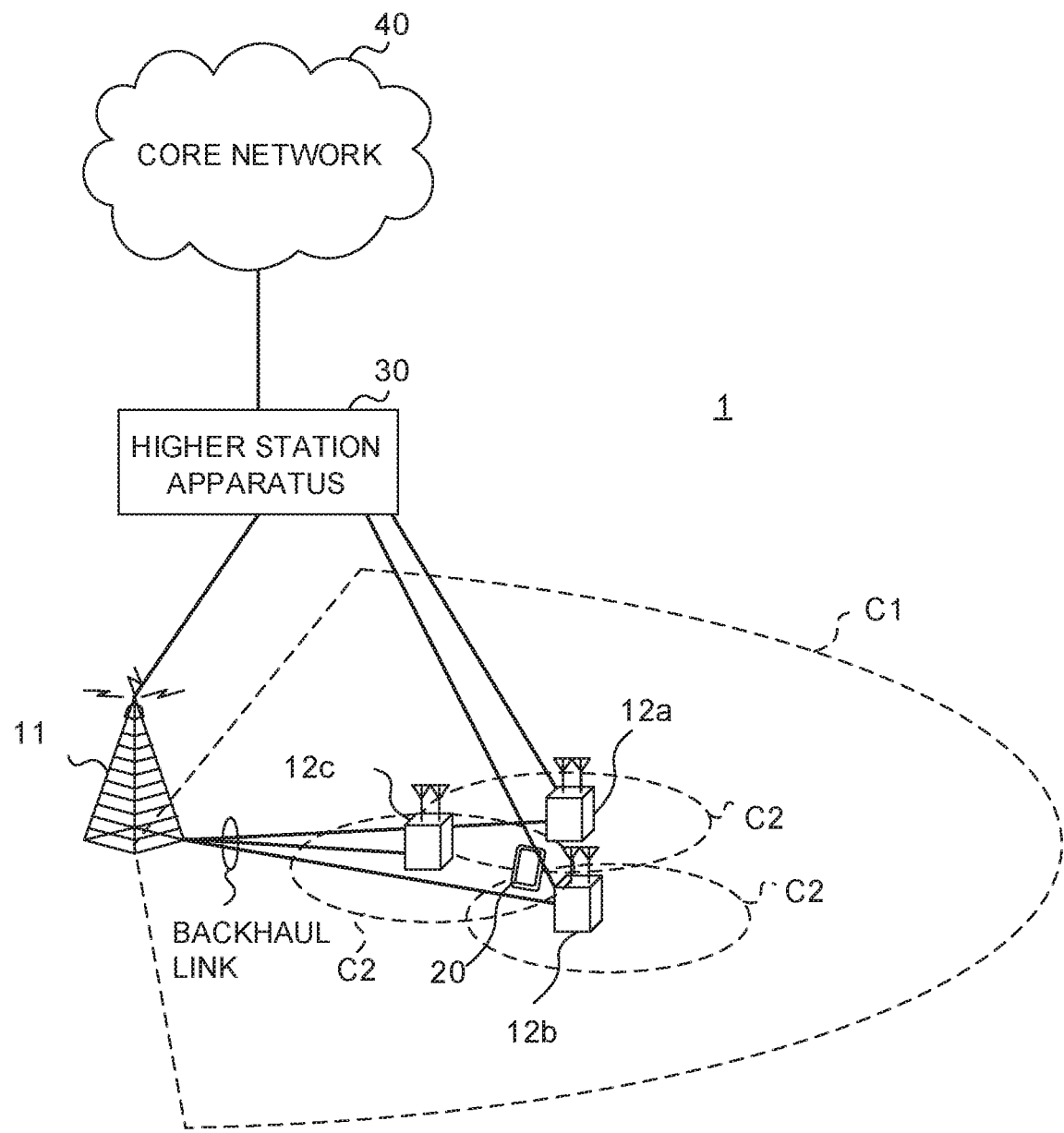
FIG. 12 is a diagram to show an exemplary schematic structure of a radio communication system according to an embodiment of the present invention.

FIG. 12 is a diagram to show an exemplary schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes 1 unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th Generation mobile communication system)," "FRA (Future Radio Access)," "New-RAT (Radio Access Technology)" "NR (New Radio)," and so on, or may be seen as a system to implement these.

The radio communication system 1 includes a radio base station 11 that forms a macro cell C1, with a relatively wide coverage, and radio base stations 12a to 12c that are placed within the macro cell C1 and that form small cells C2, which are narrower than the macro cell C1. Also, user terminals 20 are placed in the macro cell C1 and in each small cell C2. The arrangement of cells and user terminals 20 is not limited to that shown in the drawing.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, 5 or fewer CCs or 6 or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between 2 radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) is applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to this combination, and other radio access schemes may be used as well.

The radio communication system 1 may be structured so that different numerologies are applied within cells and/or between cells. Note that, a numerology refers to, for example, a communication parameter (for example, subcarrier spacing, bandwidth, etc.) that is applied to transmit and receive a certain signal.

In the radio communication system 1, a downlink shared channel (PDSCH (Physical Downlink Shared CHannel)), which is used by each user terminal 20 on a shared basis, a broadcast channel (PBCH (Physical Broadcast CHannel)), downlink L1/L2 control channels and so on are used as downlink channels. User data, higher layer control information, SIBs (System Information Blocks) and so on are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACK," "ACK/NACK," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel)), a random access channel (PRACH (Physical Random Access CHannel)) and so on are used as uplink channels. User data, higher layer control information and so on are communicated by the PUSCH. Also, downlink radio quality information (CQI (Channel Quality Indicator)), delivery acknowledgement information and so on are communicated by the PUCCH. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRS (Sounding Reference Signal)), demodulation reference signal (DMRS) and so on are communicated as uplink reference signals. Note that the DMRS may be referred to as a "user terminal-specific reference signal (UE-specific Reference Signal)." Also, the reference signals to be communicated are by no means limited to these.

(Radio Base Station)

Figure 13:
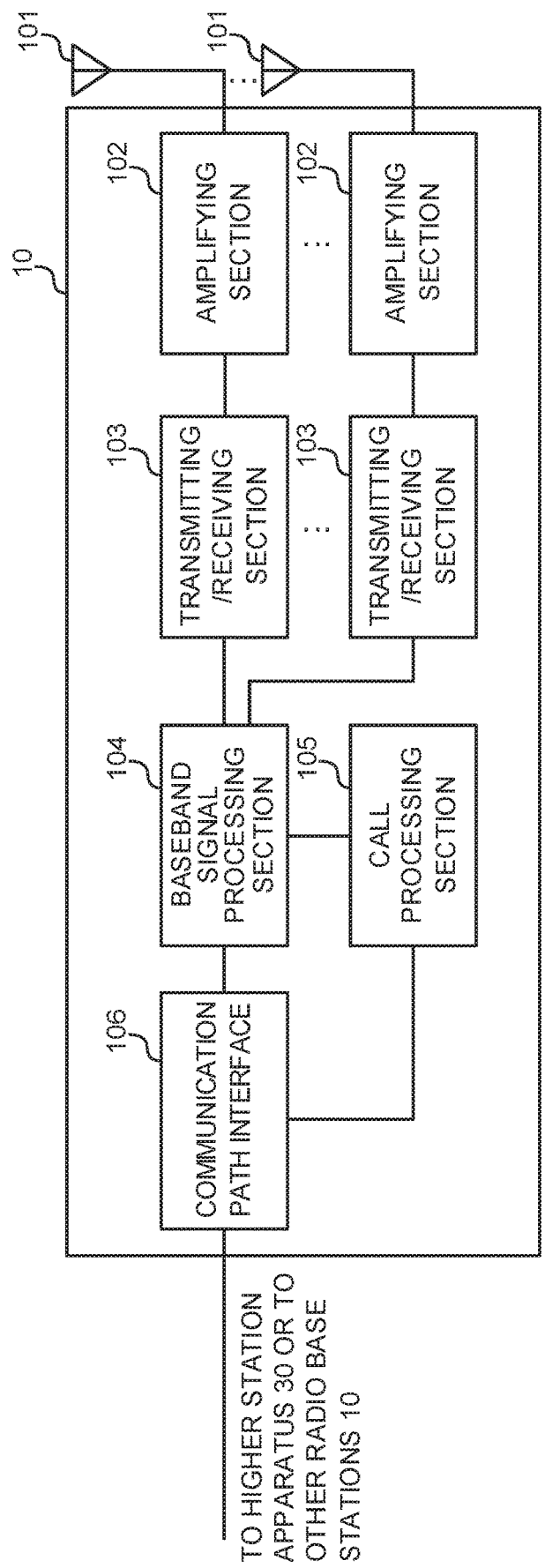
FIG. 13 is a diagram to show an exemplary overall structure of a radio base station according to an embodiment of the present invention.

FIG. 13 is a diagram to show an exemplary overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be comprised of transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be comprised of a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a certain interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

The transmitting/receiving sections 103 transmit a downlink control channel, and a reference signal that is used to receive this downlink control channel. For example, in a certain field, the transmitting/receiving sections 103 transmit an NR-PDCCH by using an NR-CCE, which is comprised of a number of NR-REGs and/or one or more REG groups, and the DMRS that is used to demodulate this NR-PDCCH. In addition, the transmitting/receiving sections 103 transmit a reference signal based on a DMRS pattern, which configured in association with at least one of an REG group, an NR-CCE, and a certain field.

Figure 14:
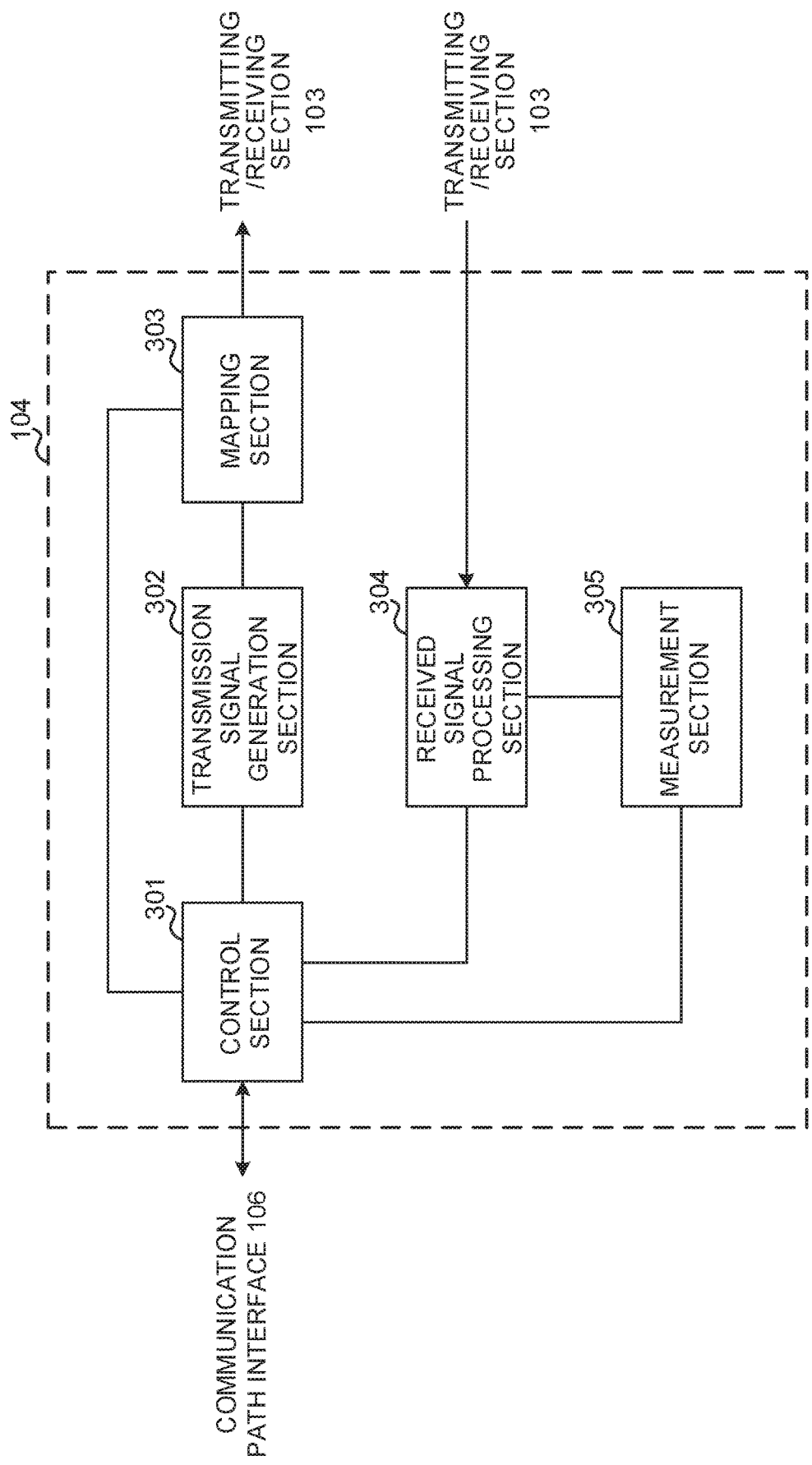
FIG. 14 is a diagram to show an exemplary functional structure of a radio base station according to one embodiment of the present invention.

FIG. 14 is a diagram to show an exemplary functional structure of a radio base station according to one embodiment of the present invention. Note that, although this example primarily shows functional blocks that pertain to characteristic parts of the present embodiment, the radio base station 10 has other functional blocks that are necessary for radio communication as well.

The baseband signal processing section 104 at least has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be comprised of a controller, a control circuit or control apparatus that can be described based on general understanding of the technical field to which the present invention pertains.

The control section 301 controls, for example, generation of signals in the transmission signal generation section 302, allocation of signals in the mapping section 303, and so on. Furthermore, the control section 301 controls signal receiving processes in the received signal processing section 304, measurements of signals in the measurement section 305, and so on.

The control section 301 controls the scheduling (for example, resource allocation) of system information, downlink data signals (for example, signals transmitted in the PDSCH) and downlink control signals (for example, signals communicated in the PDCCH, EPDCCH and NR-PDCCH). Also, the control section 301 controls the generation of downlink control signals (for example, delivery acknowledgement information and so on), downlink data signals and so on, based on whether or not retransmission control is necessary, which is decided in response to uplink data signals, and so on. Also, the control section 301 controls the scheduling of synchronization signals (for example, PSS (Primary Synchronization Signal)/SSS (Secondary Synchronization Signal)), downlink reference signals (for example, CRSs, CSI-RSs, DMRSs and so on) and so on.

In addition, the control section 301 controls the scheduling of uplink data signals (for example, signals transmitted in the PUSCH), uplink control signals (for example, signals transmitted in the PUCCH and/or the PUSCH), random access preambles transmitted in the PRACH, uplink reference signals, and so on.

In a certain field, the control section 301 controls the transmission of an NR-PDCCH by using an NR-CCE, which is comprised of a number of NR-REGs and/or one or more REG groups, and the transmission of the DMRS that is used to demodulate this NR-PDCCH. In addition, the control section 301 controls the transmission of a reference signal based on a DMRS pattern that is configured in association with at least one of an REG group, an NR-CCE, and a certain field.

For example, when an REG group is comprised of a number of REGs that neighbor each other in the frequency direction and/or the time direction, the control section 301 controls allocation so that the reference signals do not neighbor each other in the resource elements of these multiple REGs. Also, when transmitting reference signals that respectively correspond to a number of antenna ports, the control section 301 controls the transmission of the reference signals by applying the DMRS patterns corresponding to the multiple antenna ports to at least one of REG groups, NR-CCEs, and certain fields.

The transmission signal generation section 302 generates downlink signals (downlink control signals, downlink data signals, downlink reference signals and so on) based on commands from the control section 301, and outputs these signals to the mapping section 303. The transmission signal generation section 302 can be comprised of a signal generator, a signal generating circuit or signal generating apparatus that can be described based on general understanding of the technical field to which the present invention pertains.

For example, the transmission signal generation section 302 generates DL assignments, which report downlink signal allocation information, and UL grants, which report uplink signal allocation information, based on commands from the control section 301. Also, the downlink data signals are subjected to the coding process, the modulation process and so on, by using coding rates and modulation schemes that are selected based on, for example, channel state information (CSI) from each user terminal 20.

The mapping section 303 maps the downlink signals generated in the transmission signal generation section 302 to the above radio resources based on commands from the control section 301, and outputs these to the transmitting/receiving sections 103. The mapping section 303 can be comprised of a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminal 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs the decoded information, acquired through the receiving processes, to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signal. The measurement section 305 can be comprised of a measurer, a measurement circuit or measurement apparatus that can be described based on general understanding of the technical field to which the present invention pertains.

When signals are received, the measurement section 305 may measure, for example, the received power (for example, RSRP (Reference Signal Received Power)), the received quality (for example, RSRQ (Reference Signal Received Quality)), SINR (Signal to Interference plus Noise Ratio) and/or the like), uplink channel information (for example, CSI) and so on. The measurement results may be output to the control section 301.

(User Terminal)

Figure 15:
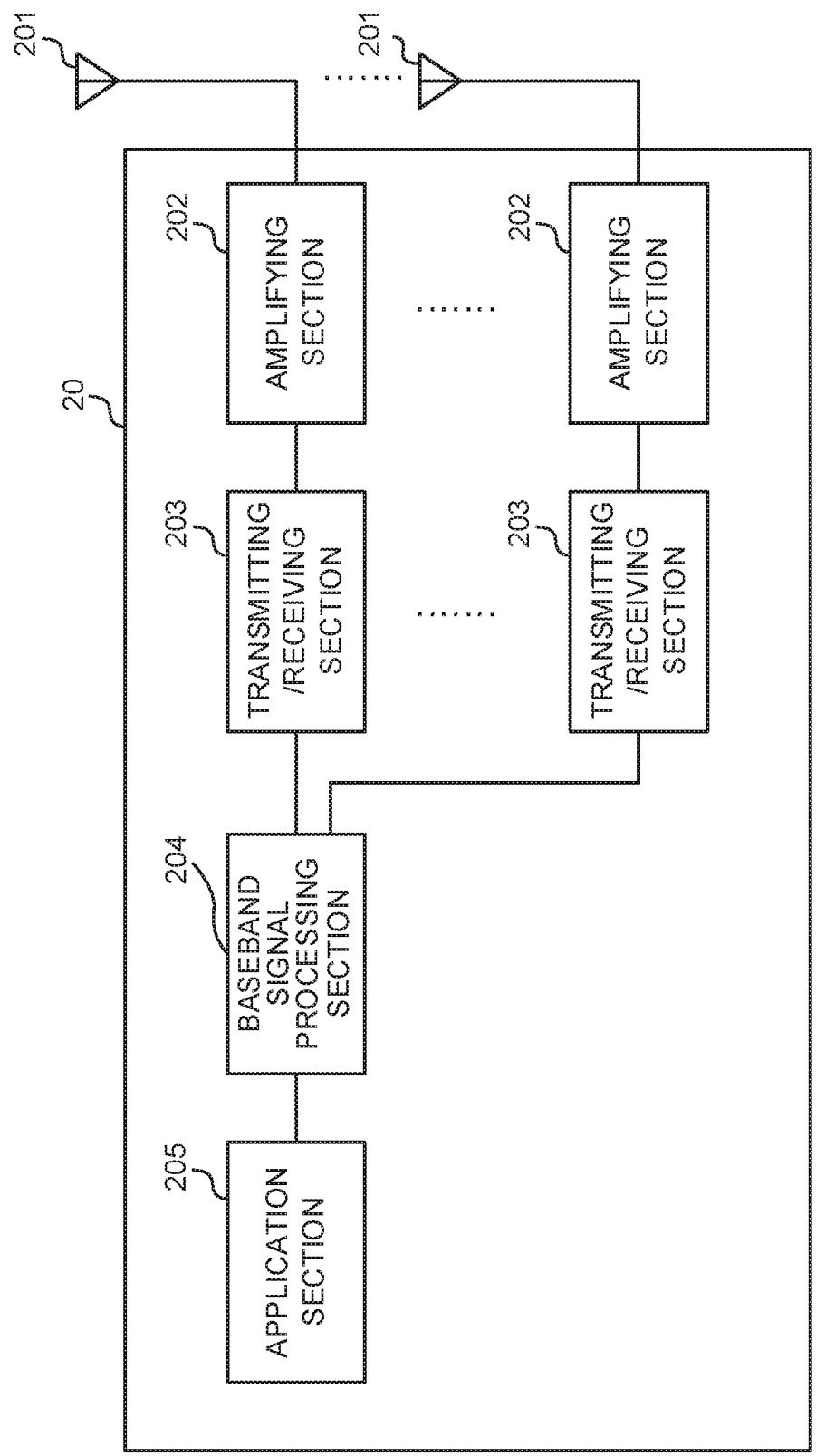
FIG. 15 is a diagram to show an exemplary overall structure of a user terminal according to an embodiment of the present invention.

FIG. 15 is a diagram to show an exemplary overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be comprised of a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be comprised of a transmitting section and a receiving section.

The baseband signal processing section 204 performs, for the baseband signal that is input, an FFT process, error correction decoding, a retransmission control receiving process and so on. Downlink user data is forwarded to the application section 205. The application section 205 performs processes related to higher layers above the physical layer and the MAC layer, and so on. Also, in the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

The transmitting/receiving sections 203 receive a downlink control channel and the reference signal to use to receive this downlink control channel (NR-PDCCH). For example, the transmitting/receiving sections 203 receive an NR-PDCCH by using an NR-CCE comprised of a number of NR-REGs and/or one or more REG groups, in a certain field, and the DMRS that is used to demodulate this NR-PDCCH. In addition, the transmitting/receiving sections 203 receive a reference signal based on a DMRS pattern, which is configured in association with at least one of an REG group, an NR-CCE, and a certain field. The transmitting/receiving sections 203 receive information about the DMRS pattern configured in association with at least one of an REG group, an NR-CCE, and a certain field.

The transmitting/receiving sections 203 receive reference signals based on an allocation pattern that is configured in advance. Also, when multiple DMRS patterns are defined in association with at least one of an REG group, an NR-CCE and a certain field, the transmitting/receiving sections 203 receive information that indicates a certain DMRS pattern. Also, the transmitting/receiving sections 203 receive reference signals that respectively correspond to a number of antenna ports, and DMRS patterns that respectively to correspond to these multiple antenna ports are configured in association with at least one of an REG group, an NR-CCE, and a certain field. In addition, the transmitting/receiving sections 203 transmit an uplink control channel that uses an uplink control channel element comprised of a number of resource element groups (UL-REGs) and/or one or more UL-REG groups, and the uplink reference signal that is used to demodulate this uplink control channel. The allocation pattern for the uplink reference signal is configured in association with at least one of an UL-REG group, an uplink control channel element and a certain field.

Figure 16:
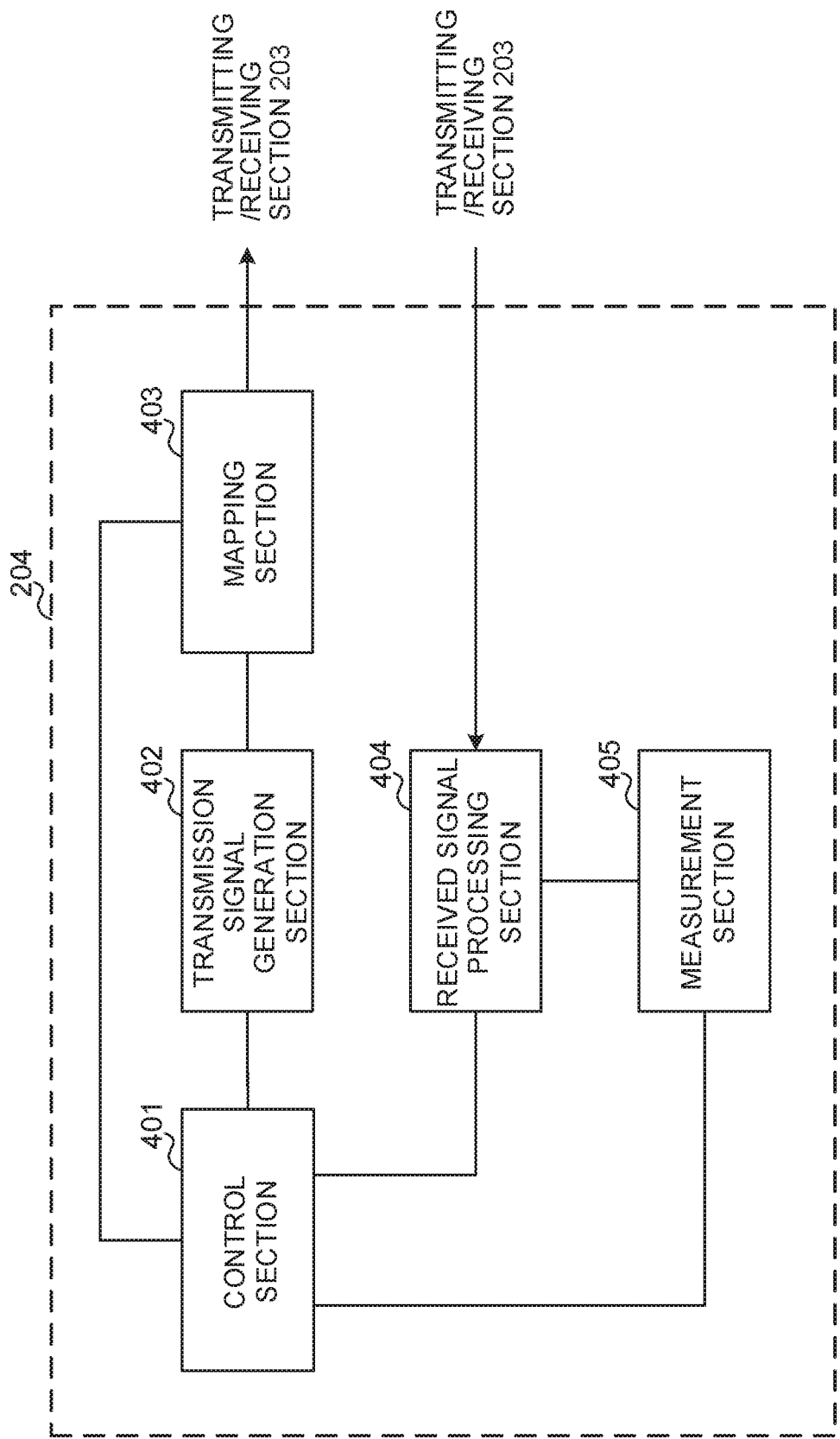
FIG. 16 is a diagram to show an exemplary functional structure of a user terminal according to an embodiment of the present invention.

FIG. 16 is a diagram to show an exemplary functional structure of a user terminal according to one embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401 controls, for example, generation of signals in the transmission signal generation section 402, allocation of signals in the mapping section 403, and so on. Furthermore, the control section 401 controls signal receiving processes in the received signal processing section 404, measurements of signals in the measurement section 405 and so on.

The control section 401 acquires downlink control signals (for example, signals transmitted in the NR-PDCCH) and downlink data signals (for example, signals transmitted in the PDSCH) transmitted from the radio base station 10, via the received signal processing section 404. The control section 401 controls the generation of uplink control signals (for example, delivery acknowledgement information and/or the like), uplink data signals and so on based on whether or not retransmission control is necessary, which is decided in response to downlink control signals, downlink data signals and so on.

The control section 401 controls the receipt of an NR-PDCCH by using an NR-CCE comprised of a number of NR-REGs and/or one or more REG groups, in a certain field, and controls the receipt of the DMRS that is used to demodulate this NR-PDCCH. The control section 401 also controls the receipt of the reference signal based on the a DMRS pattern that is configured in association with at least one of an REG group, an NR-CCE and a certain field.

Also, if an REG group is comprised of a number of REGs that neighbor each other in the frequency direction and/or the time direction, the control section 401 controls the receipt of DMRSs that are allocated so that reference signals do not neighbor each other in resource elements of these multiple REGs. Furthermore, the control section 401 controls the receipt of DMRSs based on an allocation pattern that is configured in advance.

Also, when a number of DMRS patterns are defined in association with at least one of an REG group, an NR-CCE and a certain field, the control section 401 controls the receipt of DMRSs based on information that indicates the allocation pattern for a certain reference signal.

The transmission signal generation section 402 generates uplink signals (uplink control signals, uplink data signals, uplink reference signals, etc.) based on commands from the control section 401, and outputs these signals to the mapping section 403. The transmission signal generation section 402 can be comprised of a signal generator, a signal generating circuit or signal generating apparatus that can be described based on general understanding of the technical field to which the present invention pertains.

For example, the transmission information generation section 402 generates uplink control signals such as delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and outputs the result to the transmitting/receiving sections 203. The mapping section 403 can be comprised of a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be comprised of a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. For example, the measurement section 405 performs measurements using downlink reference signals transmitted from the radio base station 10. The measurement section 405 can be comprised of a measurer, a measurement circuit or measurement apparatus that can be described based on general understanding of the technical field to which the present invention pertains.

The measurement section 405 may measure, for example, the received power (for example, RSRP), the received quality (for example, RSRQ, received SINR), down link channel information (for example, CSI) and so on of the received signals. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these multiple pieces of apparatus.

Figure 17:
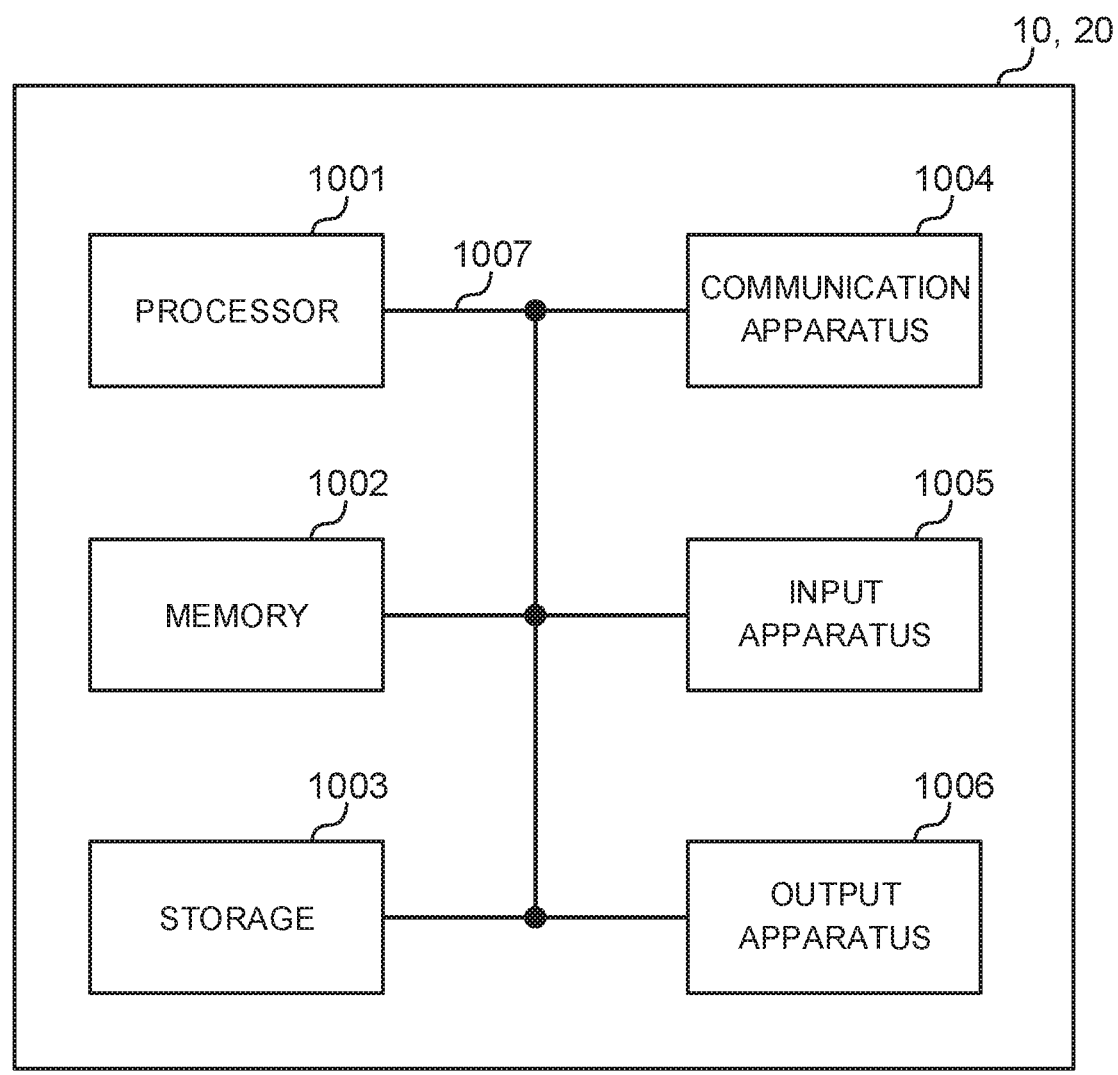
FIG. 17 is a diagram to show an exemplary hardware structure of a radio base station and a user terminal according to an embodiment of the present invention.

For example, the radio base station, user terminals and so on according to one embodiment of the present invention may function as a computer that executes the processes of the radio communication method of the present invention. FIG. 17 is a diagram to show an exemplary hardware structure of a radio base station and a user terminal according to one embodiment of the present invention.

Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only 1 processor 1001 is shown, a plurality of processors may be provided. Furthermore, processes may be implemented with 1 processor, or processes may be implemented in sequence, or in different manners, on one or more processors. Note that the processor 1001 may be implemented with one or more chips.

Each function of the radio base station 10 and the user terminal 20 is implemented by reading certain software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and others may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be comprised of, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory (primary storage apparatus)" and so on. The memory 1002 can store executable programs (program codes), software modules and so on for implementing the radio communication methods according to embodiments of the present invention.

The storage 1003 is a computer-readable recording medium, and may be comprised of, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. A subframe may be a fixed time duration (for example, 1 ms) not dependent on the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of minislots. Each minislot may be comprised of one or more symbols in the time domain. Also, a minislot may be referred to as a "subslot."

A radio frame, a subframe, a slot, a minislot and a symbol all represent the time unit in signal communication. A radio frame, a subframe, a slot, a minislot and a symbol may be each called by other applicable names. For example, 1 subframe may be referred to as a "transmission time interval (TTI)," or a plurality of consecutive subframes may be referred to as a "TTI," or 1 slot or mini-slot may be referred to as a "TTI." That is, a subframe and/or a TTI may be a subframe (1 ms) in existing LTE, may be a shorter period than 1 ms (for example, 1 to 13 symbols), or may be a longer period of time than 1 ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that, when a TTI is given, the period of time (for example, the number of symbols) in which transport blocks, code blocks and/or codewords are actually mapped may be shorter than the TTI.

Note that, when 1 slot or 1 minislot is referred to as a "TTI," one or more TTIs (that is, one or multiple slots or one or more minislots) may be the minimum time unit of scheduling. Also, the number of slots (the number of minislots) to constitute this minimum time unit of scheduling may be controlled.

A TTI having a time duration of 1 ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," "a partial TTI (or a "fractional TTI"), a "shortened subframe," a "short subframe," a "mini-slot," "a sub-slot" and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI length less than the TTI length of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be 1 slot, 1 minislot, 1 subframe or 1 TTI in length. 1 TTI and 1 subframe each may be comprised of one or more resource blocks. Note that one or more RBs may be referred to as a "physical resource block (PRB (Physical RB))," a "subcarrier group (SCG)," a "resource element group (REG)," a "PRB pair," an "RB pair" and so on.

Furthermore, a resource block may be comprised of one or more resource elements (REs). For example, 1 RE may be a radio resource field of 1 subcarrier and 1 symbol.

Note that the structures of radio frames, subframes, slots, minislots, symbols and so on described above are merely examples. For example, configurations pertaining to the number of subframes included in a radio frame, the number of slots included in a subframe, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to certain values, or may be represented in other information formats. For example, radio resources may be specified by certain indices. In addition, equations to use these parameters and so on may be used, apart from those explicitly disclosed in this specification.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, a memory), or may be managed using a management table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of certain information (for example, reporting of information to the effect that "X holds") does not necessarily have to be sent explicitly, and can be sent implicitly (by, for example, not reporting this piece of information, or by reporting a different piece of information).

Decisions may be made in values represented by 1 bit (0 or 1), may be made in Boolean values that represent true or false, or may be made by comparing numerical values (for example, comparison against a certain value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, 3) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may also be referred to as, for example, a "subscriber station," a "mobile unit," a "subscriber unit," a "wireless unit," a "remote unit," a "mobile device," a "wireless device," a "wireless communication device," a "remote device," a "mobile subscriber station," an "access terminal," a "mobile terminal," a "wireless terminal," a "remote terminal," a "handset," a "user agent," a "mobile client," a "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by higher nodes (upper nodes). In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The examples/embodiments illustrated in this specification may be used individually or in combinations, which may be switched depending on the mode of implementation. The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark) and other adequate radio communication methods, and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used herein only for convenience, as a method of distinguishing between two or more elements. In this way, reference to the first and second elements does not imply that only 2 elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between 2 elements that are "connected" or "coupled" to each other. The coupling or connection between the elements may be physical, logical or a combination thereof. For example, "connection" may be interpreted as "access." As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency fields, microwave regions and optical (both visible and invisible) regions.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
    a receiver that receives a downlink control channel, which is transmitted by using a downlink control channel element comprised of a plurality of resource element groups (REGs) and/or one or more REG groups, and a reference signal, which is used to demodulate the downlink control channel; and
    a processor that controls receipt of the downlink control channel in a certain field,
    wherein an allocation pattern of the reference signal is configured in association with at least one of the REG group, the downlink control channel element and the certain field, and
    wherein when the REG group is comprised of a plurality of REGs that neighbor each other in a frequency direction and/or a time direction, reference signals are allocated so as not to neighbor each other in resource elements of the plurality of REGs.

2. The terminal according to claim 1, wherein the receiver receives the reference signal based on an allocation pattern that is defined in advance.

3. The terminal according to claim 1, wherein:
a plurality of allocation patterns for the reference signal are defined in association with at least one of the REG group, the downlink control channel element and the certain field; and,
the receiver receives information that indicates the allocation pattern for a certain reference signal.

4. The terminal according to claim 1, wherein:
the receiver receives reference signals that respectively correspond to a plurality of antenna ports; and,
allocation patterns for the reference signals that respectively correspond to the plurality of antenna ports are configured in association with at least one of the REG group, the downlink control channel element and the certain field.

5. The terminal according to claim 2, wherein:
the receiver receives reference signals that respectively correspond to a plurality of antenna ports; and,
allocation patterns for the reference signals that respectively correspond to the plurality of antenna ports are configured in association with at least one of the REG group, the downlink control channel element and the certain field.

6. The terminal according to claim 3, wherein:
the receiver receives reference signals that respectively correspond to a plurality of antenna ports; and,
allocation patterns for the reference signals that respectively correspond to the plurality of antenna ports are configured in association with at least one of the REG group, the downlink control channel element and the certain field.

7. A radio communication method for a terminal, comprising:
receiving a downlink control channel, which is transmitted by using a downlink control channel element comprised of a plurality of resource element groups (REGs) and/or one or more REG groups, and a reference signal, which is used to demodulate the downlink control channel; and
controlling receipt of the downlink control channel in a certain field,
wherein an allocation pattern of the reference signal is configured in association with at least one of the REG group, the downlink control channel element and the certain field, and
wherein when the REG group is comprised of a plurality of REGs that neighbor each other in a frequency direction and/or a time direction, reference signals are allocated so as not to neighbor each other in resource elements of the plurality of REGs.

8. A terminal comprising:
a transmitter that transmits an uplink control channel, which uses an uplink control channel element comprised of a plurality of resource element groups (UL-REGs) and/or one or more UL-REG groups, and an uplink reference signal, which is used to demodulate the uplink control channel; and
a processor that controls transmission of the uplink control channel in a certain field,
wherein an allocation pattern of the uplink reference signal is configured in association with at least one of the UL-REG group, the uplink control channel element and the certain field, and
wherein when the REG group is comprised of a plurality of REGs that neighbor each other in a frequency direction and/or a time direction, reference signals are allocated so as not to neighbor each other in resource elements of the plurality of REGs.

\* \* \* \* \*